United States Patent
Koyata et al.

(10) Patent No.: US 6,622,158 B1
(45) Date of Patent: Sep. 16, 2003

(54) CHARACTER INFORMATION COPYING SYSTEM, RECORDING APPARATUS, AND RECORDING METHOD

(75) Inventors: Tomohiro Koyata, Tokyo (JP); Takahiro Hirai, Kanagawa (JP); Shinji Isozaki, Nagano (JP); Hiroshi Mizuno, Nagano (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/290,956

(22) Filed: Apr. 13, 1999

(30) Foreign Application Priority Data

Apr. 20, 1998 (JP) ......................... P10-109115

(51) Int. Cl.⁷ .................. G06F 15/16; G11B 7/085; G09G 5/00
(52) U.S. Cl. ............... 709/203; 369/30.07; 345/740
(58) Field of Search ............... 345/769–770, 345/716–717, 721, 727, 740, 970.1; 700/94; 369/30.03–30.05, 30.07–30.08, 69, 83; 707/505, 507; 709/203, 312, 217–219; 717/505, 507

(56) References Cited

U.S. PATENT DOCUMENTS

| | | | |
|---|---|---|---|
| 5,751,672 A | * 5/1998 | Yankowski | 709/238 |
| 6,233,633 B1 | * 5/2001 | Douma | 710/69 |
| 6,295,267 B1 | * 9/2001 | Takaku et al. | 369/83 |
| 6,304,523 B1 | * 10/2001 | Jones et al. | 369/30.08 |
| 6,392,964 B2 | * 5/2002 | Koyata et al. | 369/30.04 |
| 6,462,753 B1 | * 10/2002 | Koyata et al. | 345/716 |
| 6,519,676 B1 | * 2/2003 | Suzuki et al. | 711/112 |

FOREIGN PATENT DOCUMENTS

| | | | |
|---|---|---|---|
| EP | 0 805 443 A | * 11/1993 | |
| EP | 0762422 A2 | 3/1997 | ........... G11B/27/00 |
| EP | 0777230 A1 | 6/1997 | ........... G11B/27/28 |
| EP | 0823709 A1 | 2/1998 | ......... G11B/27/031 |
| WO | 97/05616 | 2/1997 | ........... G11B/27/00 |

OTHER PUBLICATIONS

Sherf, S., The FreeDB File Format, www.freedb.org/src/latest/DBFORM, pp. 1–4, Aug. 2001.*
MD Editor Manual, PCLK–MD1, Sony Corp., pp. 1–31, Jan. 1998.*
Zawodny, J., Net CDDB—Communicate with CDDB Servers Using CDDB Protocol, family.zawodny.com/~jzawodn/perl/Net–CDDB/CDDB, pp. 1–5, Dec. 1997.*
VanderWerf, J., DMX Title, pweb.netcom.com/~jt/DMX-Title, pp. 1–3, Dec. 1998.*
U.S. application No. 09/149,431, Sep. 8, 1998.
U.S. application No. 09/145,902, Sep. 2, 1998.
U.S. patent application Ser. No. 09/290,956, filed Apr. 13, 1999, pending.
U.S. patent application Ser. No. 09/950,639, filed Sep. 13, 2001, pending.

* cited by examiner

*Primary Examiner*—Andrew Caldwell
(74) *Attorney, Agent, or Firm*—Oblon, Spivak, McClelland, Maier & Neustadt, P.C.

(57) ABSTRACT

The invention provides a character information copying system, a recording apparatus, and a recording method in which characters can be easily copied onto a recording medium by copying and pasting character information such as titles of music pieces, singer names, and the like opened on a computer communication network and by transmitting it to the recording apparatus via an interface.

16 Claims, 18 Drawing Sheets

Fig. 4

| ← 16 BITS → | | ← 16 BITS → | | |
|---|---|---|---|---|
| MSB         LSB | MSB         LSB | MSB         LSB | MSB         LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| ClusterH | ClusterL | 00000000 | 00000010 | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| Maker code | Model code | First TNO | Last TNO | 7 |
| 00000000 | 00000000 | 00000000 | Used Sectors | 8 |
| 00000000 | 00000000 | 00000000 | 00000000 | 9 |
| 00000000 | 00000000 | 00000000 | Disc Serial No. | 10 |
| Disc | ID | P–DFA | P–EMPTY | 11 |
| P–FRA | P–TNO1 | P–TNO2 | P–TNO3 | 12 |
| P–TNO4 | P–TNO5 | P–TNO6 | P–TNO7 | 13 |
| P–TNO248 | P–TNO249 | P–TNO250 | P–TNO251 | 74 |
| P–TNO252 | P–TNO253 | P–TNO254 | P–TNO255 | 75 |
| 00000000 | 00000000 | 00000000 | 00000000 | 76 |
| 00000000 | 00000000 | 00000000 | 00000000 | 77 |
| 01h | START ADDRESS | | TRACKING MODE | 78 |
|  | END ADDRESS | | LINK INFO. | 79 |
| 02h | START ADDRESS | | TRACKING MODE | 80 |
|  | END ADDRESS | | LINK IINFO. | 81 |
| 03h | START ADDRESS | | TRACKING MODE | 82 |
|  | END ADDRESS | | LINK IINFO. | 83 |
| FCh | START ADDRESS | | TRACKING MODE | 580 |
|  | END ADDRESS | | LINK IINFO. | 581 |
| FDh | START ADDRESS | | TRACKING MODE | 582 |
|  | END ADDRESS | | LINK IINFO. | 583 |
| FEh | START ADDRESS | | TRACKING MODE | 584 |
|  | END ADDRESS | | LINK IINFO. | 585 |
| FFh | START ADDRESS | | TRACKING MODE | 586 |
|  | END ADDRESS | | LINK IINFO. | 587 |

U–TOC SECTOR 0

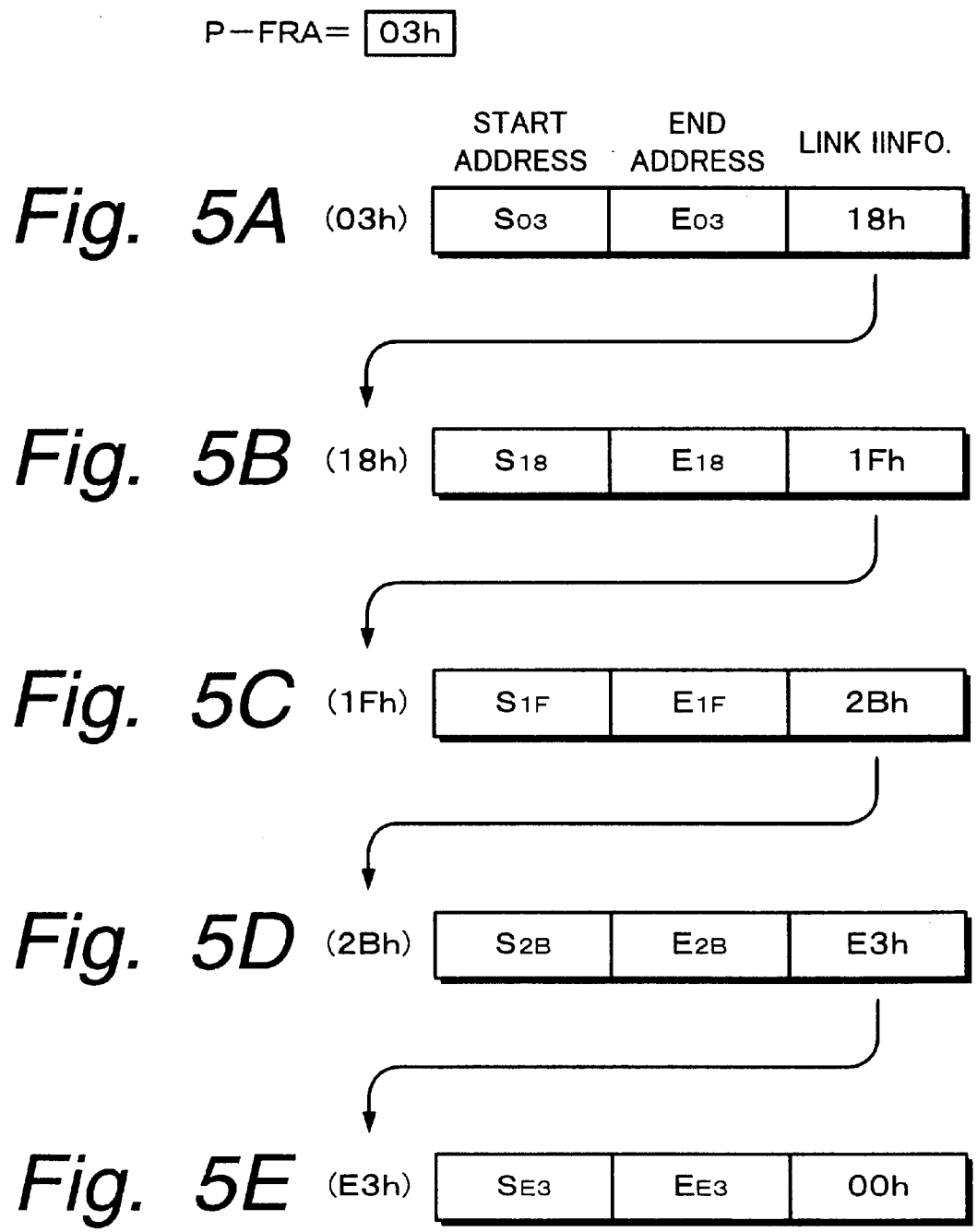

Fig. 6

| 16 BITS | | 16 BITS | | |
|---|---|---|---|---|
| MSB          LSB | MSB          LSB | MSB          LSB | MSB          LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| ClusterH | ClusterL | 00000001 | 00000010 | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| 00000000 | 00000000 | 00000000 | 00000000 | 7 |
| 00000000 | 00000000 | 00000000 | 00000000 | 8 |
| 00000000 | 00000000 | 00000000 | 00000000 | 9 |
| 00000000 | 00000000 | 00000000 | 00000000 | 10 |
| 00000000 | 00000000 | 00000000 | P-EMPTY | 11 |
| 00000000 | P-TNA1 | P-TNA2 | P-TNA3 | 12 |
| P-TNA4 | P-TNA5 | P-TNA6 | P-TNA7 | 13 |
| P-TNA248 | P-TNA249 | P-TNA250 | P-TNA251 | 74 |
| P-TNA252 | P-TNA253 | P-TNA254 | P-TNA255 | 75 |
| 00000000 | 00000000 | 00000000 | 00000000 | 76 |
| 00000000 | 00000000 | 00000000 | 00000000 | 77 |

| | | |
|---|---|---|
| 01h | DISC NAME | 78 |
| | DISC NAME | LINK IINFO. | 79 |
| 02h | DISC NAME/TRACK NAME | 80 |
| | DISC NAME/TRACK NAME | LINK IINFO. | 81 |
| 03h | DISC NAME/TRACK NAME | 82 |
| | DISC NAME/TRACK NAME | LINK IINFO. | 83 |
| FEh | DISC NAME/TRACK NAME | 584 |
| | DISC NAME/TRACK NAME | LINK IINFO. | 585 |
| FFh | DISC NAME/TRACK NAME | 586 |
| | DISC NAME/TRACK NAME | LINK IINFO. | 587 |

U-TOC SECTOR 1

Fig. 7

| 16 BITS | | 16 BITS | | |
|---|---|---|---|---|
| MSB        LSB | MSB        LSB | MSB        LSB | MSB        LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| ClusterH | ClusterL | 00000100 | 00000010 | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| 00000000 | 00000000 | 00000000 | 00000000 | 7 |
| 00000000 | 00000000 | 00000000 | 00000000 | 8 |
| 00000000 | 00000000 | 00000000 | 00000000 | 9 |
| 00000000 | 00000000 | 00000000 | 00000000 | 10 |
| 00000000 | 00000000 | 00000000 | P-EMPTY | 11 |
| 00000000 | P-TNA1 | P-TNA2 | P-TNA3 | 12 |
| P-TNA4 | P-TNA5 | P-TNA6 | P-TNA7 | 13 |
| P-TNA248 | P-TNA249 | P-TNA250 | P-TNA251 | 74 |
| P-TNA252 | P-TNA253 | P-TNA254 | P-TNA255 | 75 |
| 00000000 | 00000000 | 00000000 | 00000000 | 76 |
| 00000000 | 00000000 | 00000000 | 00000000 | 77 |

| | | | |
|---|---|---|---|
| 01h | DISC NAME | | 78 |
| | DISC NAME | LINK IINFO. | 79 |
| 02h | DISC NAME/TRACK NAME | | 80 |
| | DISC NAME/TRACK NAME | LINK IINFO. | 81 |
| 03h | DISC NAME/TRACK NAME | | 82 |
| | DISC NAME/TRACK NAME | LINK IINFO. | 83 |
| FEh | DISC NAME/TRACK NAME | | 584 |
| | DISC NAME/TRACK NAME | LINK IINFO. | 585 |
| FFh | DISC NAME/TRACK NAME | | 586 |
| | DISC NAME/TRACK NAME | LINK IINFO. | 587 |

U-TOC SECTOR 4

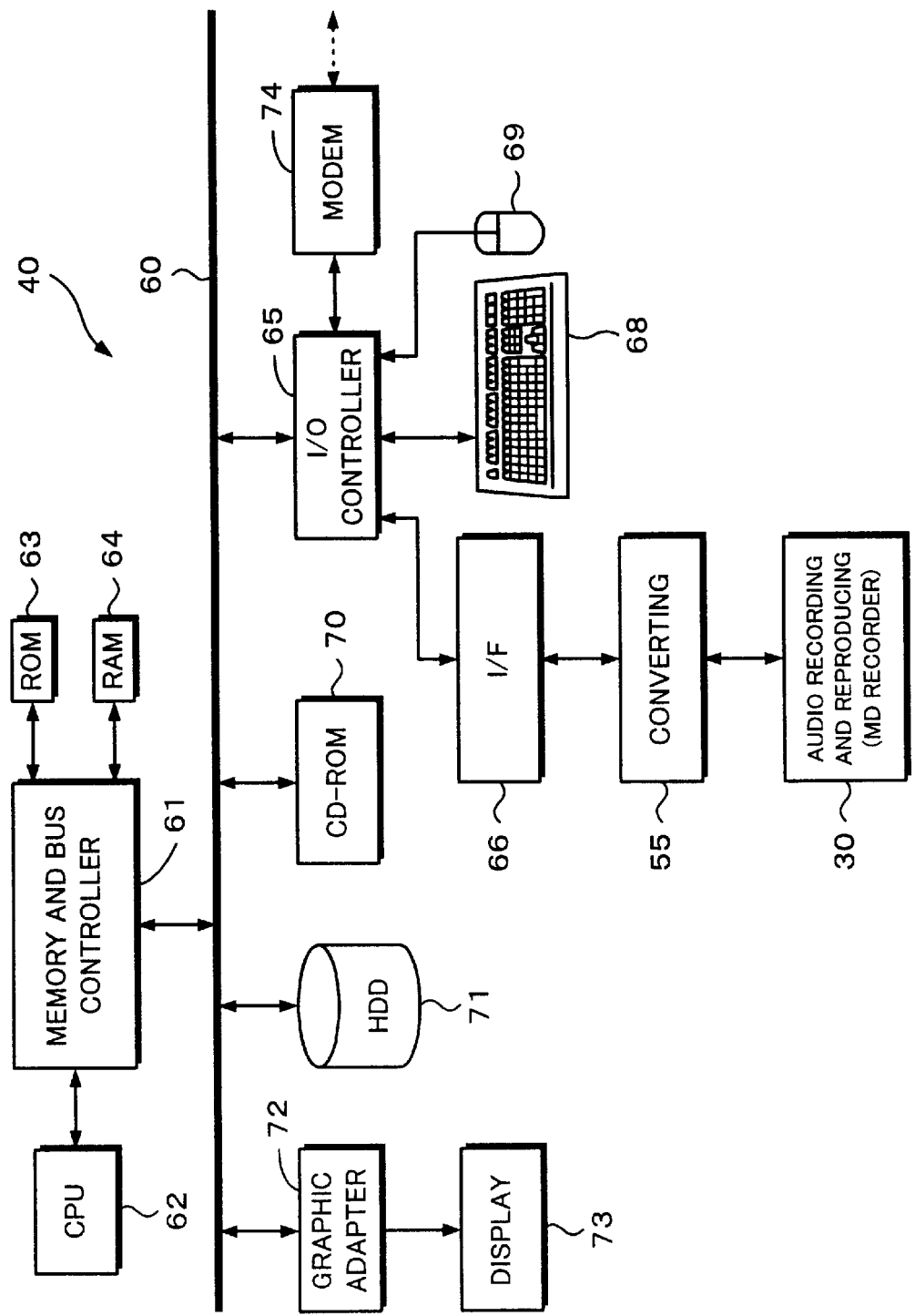

Fig. 10

1st MUSIC PIECE   MUSIC TITLE [CR]
TRACK 01 TITLE [CR]
2nd MUSIC PIECE   MUSIC TITLE [CR]
TRACK 02 TITLE [CR]
⋮
Nth MUSIC PIECE   MUSIC TITLE [CR]
TRACK N TITLE [CR]

~ 90

Fig. 12A
Fig. 12C
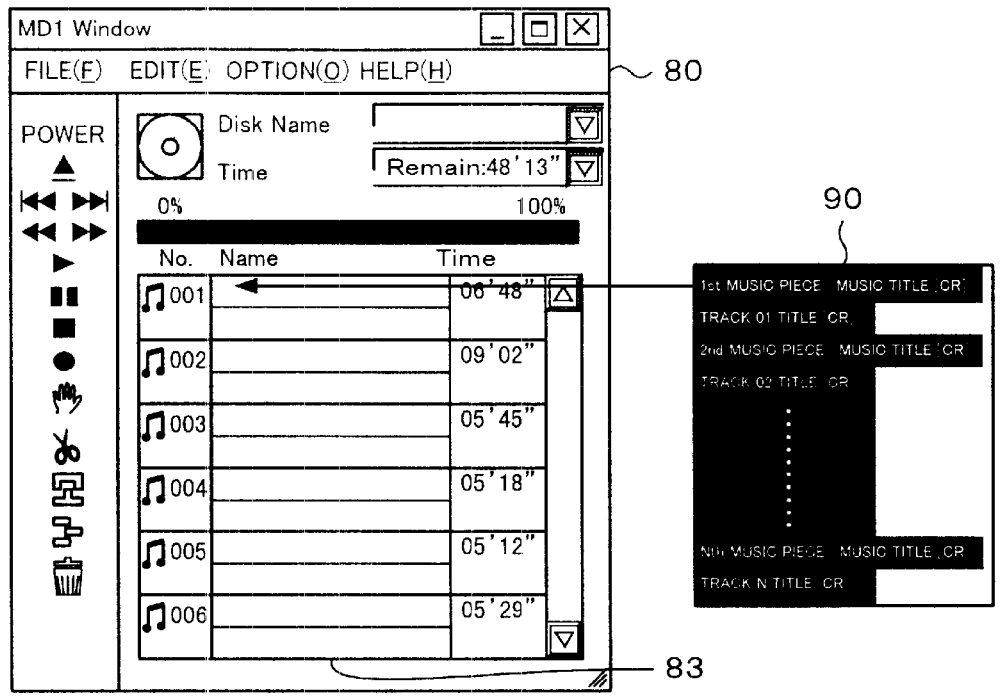
Fig. 12B
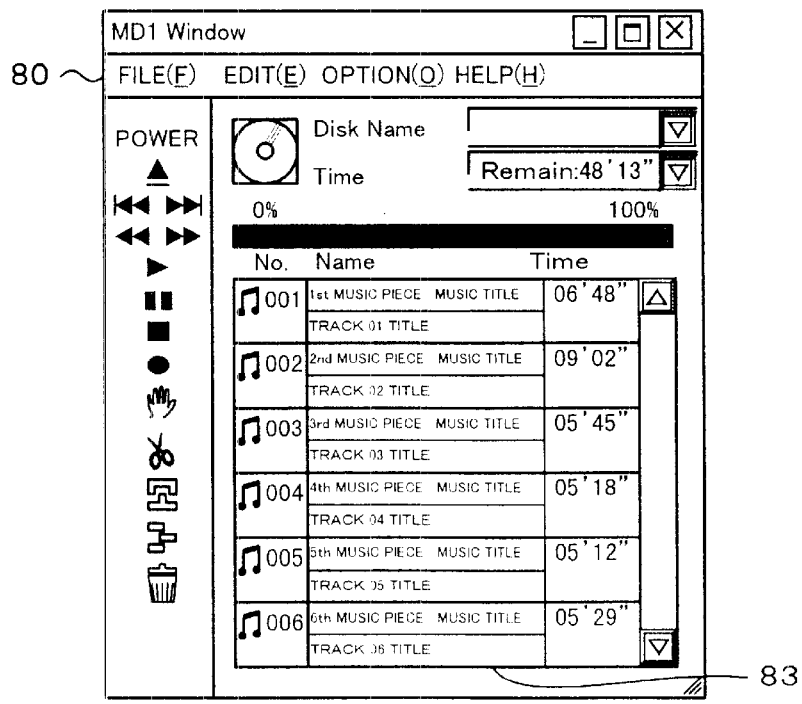

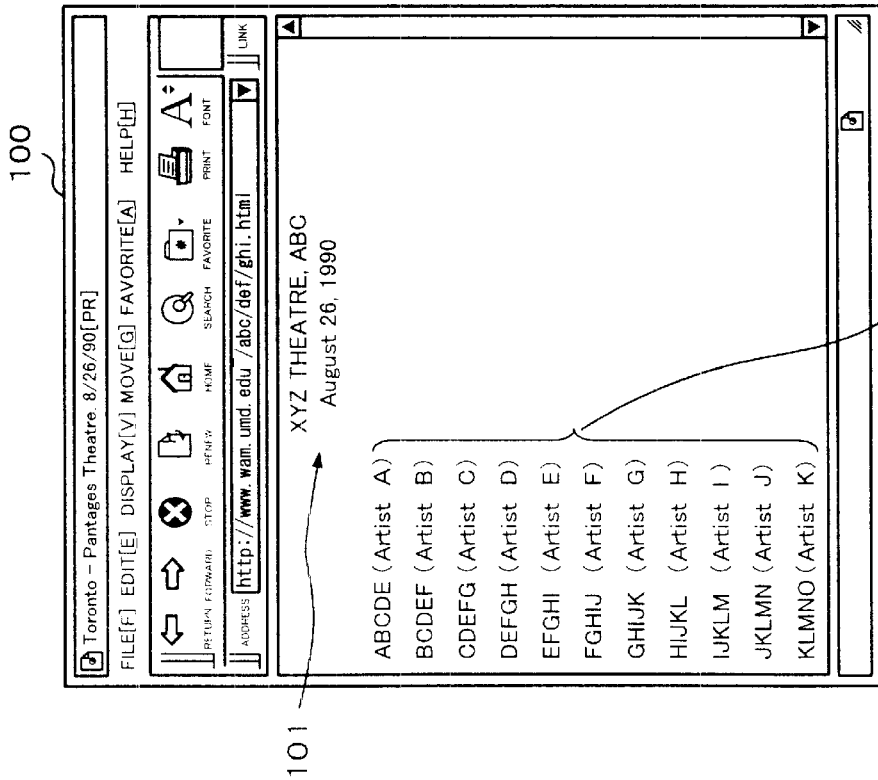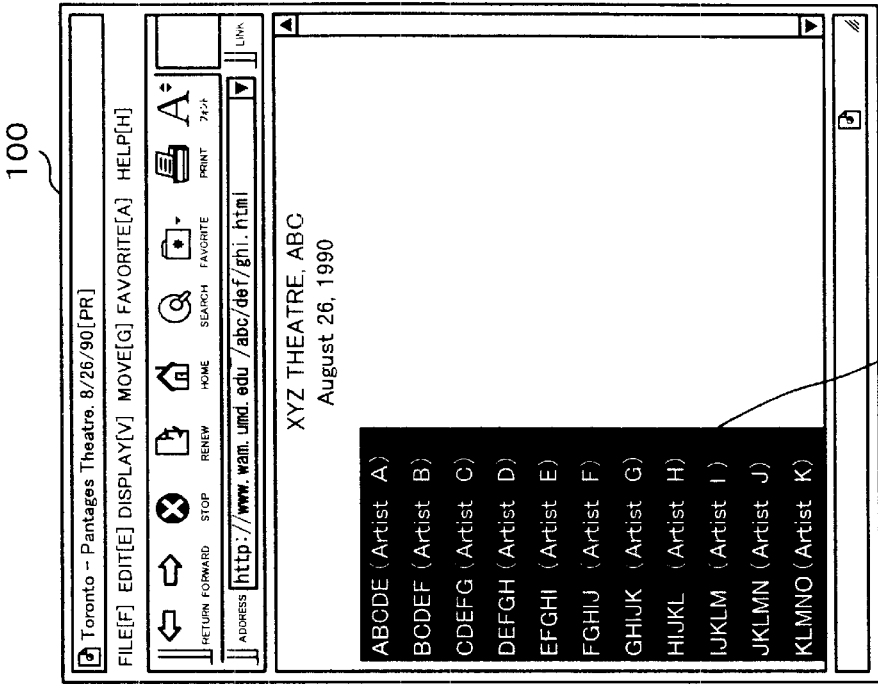

Fig. 14

XYZ THEATRE, ABC ⟨BR⟩
August 26, 1990 ⟨BR⟩

⟨P⟩
| | | |
|---|---|---|
| ABCDE | (Artist A) | ⟨BR⟩ |
| BCDEF | (Artist B) | ⟨BR⟩ |
| CDEFG | (Artist C) | ⟨BR⟩ |
| DEFGH | (Artist D) | ⟨BR⟩ |
| EFGHI | (Artist E) | ⟨BR⟩ |
| FGHIJ | (Artist F) | ⟨BR⟩ |
| GHIJK | (Artist G) | ⟨BR⟩ |
| HIJKL | (Artist H) | ⟨BR⟩ |
| IJKLM | (Artist I ) | ⟨BR⟩ |
| JKLMN | (Artist J) | ⟨BR⟩ |
| KLMNO | (Artist K) | ⟨BR⟩ |

⟨P⟩

CHARACTER INFORMATION COPYING SYSTEM, RECORDING APPARATUS, AND RECORDING METHOD

BACKGROUND OF THE INVENTION

1. Field of the Invention

The invention relates to a character information copying system, a recording apparatus, and a recording method in which information opened on a computer communication network is copied and the copied information can be easily recorded as character information of each program on a recording medium.

2. Description of the Related Art

Hitherto, a magnetooptic disc apparatus for recording and reproducing a program such as music or the like onto a magnetooptic disc such as an MD (Mini Disc; registered trade name) has been known. In the MD, for example, a program comprising digital music data or the like which was compression encoded by an ATRAC (Adaptive TRansform Acoustic Coding) system is recorded and management information of the recorded program is recorded on the inner rim side. An area in which the management information is recorded is called U-TOC (User—Table Of Contents) area.

The program is managed on a track unit basis. For example, when the program is music data, one music piece can be recorded as one track. By designating a desired track upon reproduction, the music piece recorded on this track, namely, music data is reproduced.

The U-TOC area is constructed by, for example, 32 sectors. In a sector 1 and a sector 4 among them, character information such as title names or the like corresponding to the recorded program is managed. The sectors 1 and 4 correspond to different character forms. For example, in the sector 1, alphabets expressed by ASCII (American Standard Code for Information Interchange) codes are managed. In sector 4, character information comprising Kanji (Chinese characters), Hiragana, or the like expressed by character codes based on ISO (International Organization for Standardization)—8859-1 or shift JIS (Japanese Industrial Standard) is managed. An area to manage a correspondence between track information of the program and character information is provided for each sector and a pointer of the character information corresponding to the track is written in this area.

The character information is inputted by operating a key provided for the magnetooptic disc apparatus, a key provided on a remote controller, or the like.

A case of inputting character information to the MD will now be considered. For instance, title information of a music piece is inputted and recorded for the music data recorded on each track. In the above case, hitherto, it is necessary to select a track to be inputted each time information is inputted. Hitherto, each time alphabets, Kanji, or Hiragana is inputted, it is necessary to designate a memory area to be inputted.

Hitherto, character information such as album title, music piece title, singer name, and the like has to be inputted by the operation of the key provided for the magnetooptic disc apparatus or the key provided on the remote controller. The inputting operation is complicated and is a troublesome operation for the user.

For example, in a computer communication network such as Internet, much information regarding each commercially available CD (Compact Disc) has been opened. For example, when a new CD is released or the like, there is a case where a sales agency opens the recorded contents of the CD as an HTML (Hyper-Text Markup Language) file onto a homepage of Internet for the purpose of sales promotion. There is also a case where an individual such as a lover of music or the like opens the information such as recorded contents of a CD or the like on his homepage. Further, by using what is called a search engine, for instance, information such as recorded contents of the CD or the like on the homepage can be searched by a keyword such as a singer name or music piece title.

OBJECTS AND SUMMARY OF THE INVENTION

It is, therefore, an object of the invention to provide a digital signal recording system, a character code input apparatus, and a character code input method in which character information of each track can be easily inputted.

Another object of the invention is to provide a digital signal recording system, a character code input apparatus, and a character code input method in which character information by different character forms can be easily recorded into each corresponding area.

Still another object of the invention is to provide a digital signal recording system, a digital signal recording apparatus, and a digital signal recording method in which by fetching information from a homepage on Internet, information such as recorded contents of a CD or the like can be easily recorded.

In consideration of the above problems, according to the invention, there is provided a character information copying system for transferring character information from a terminal apparatus to a recording apparatus and recording the received character information onto a recording medium loaded in the recording apparatus, wherein the terminal apparatus comprises:
receiving means for receiving the character information from a server in which the character information regarding a predetermined program has been accumulated;
display means for displaying the character information received by the receiving means;
selecting means for selecting arbitrary character information from the character information displayed on the display means; and
transfer means for transferring the arbitrary character information selected by the selecting means,
and wherein the recording apparatus comprises:
receiving means for receiving the arbitrary character information which is transmitted from the transfer means of the terminal apparatus; and
recording means for recording the arbitrary character information received by the receiving means onto the recording medium so as to correspond to a predetermined program recorded on the recording medium.

There is also provided a recording apparatus comprising:
receiving means for receiving a series of character information constructed by character information of a plurality of programs selected on a terminal apparatus side;
detecting means for detecting an identifier showing a boundary of the plurality of programs from the series of character information received by the receiving means;
dividing means for dividing the series of character information into character information corresponding to each program on the basis of the identifier detected by the detecting means; and recording means for recording the character information of each program divided by the dividing means so as to correspond to a predetermined program recorded on the recording medium.

There is further provided a recording method comprising the steps of:

receiving a series of character information constructed by character information of a plurality of programs selected on a terminal apparatus side;

detecting an identifier showing a boundary of the plurality of programs from the series of character information received by the receiving step;

dividing the series of character information into character information corresponding to each program on the basis of the identifier detected by the detecting step;

making the character information of each program divided in the dividing step correspond to a predetermined program recorded on a recording medium; and recording the character information of each program which was made correspond to the predetermined program onto the recording medium.

The above and other objects and features of the present invention will become apparent from the following detailed description and the appended claims with reference to the accompanying drawings.

BRIEF DESCRIPTION OF THE DRAWINGS

FIG. 4 is a schematic diagram showing an example of a construction of a U-TOC sector 0 of the mini disc;

FIG. 5A is a schematic diagram showing an example of a reproducing process using U-TOC in the case where a slot 03h is accessed;

FIG. 5B is a schematic diagram showing an example of a reproducing process using U-TOC in the case where a slot 18h is accessed;

FIG. 5C is a schematic diagram showing an example of a reproducing process using U-TOC in the case where a slot 1Fh is accessed;

FIG. 5D is a schematic diagram showing an example of a reproducing process using U-TOC in the case where a slot 2Bh is accessed;

FIG. 5E is a schematic diagram showing an example of a reproducing process using U-TOC in the case where a slot E3h is accessed;

FIG. 6 is a schematic diagram showing an example of a construction of a U-TOC sector 1 of the MD;

FIG. 7 is a schematic diagram showing an example of a construction of a U-TOC sector 4 of the MD;

FIG. 8 is a block diagram showing an example of a construction of a personal computer;

FIG. 10 is a schematic diagram showing an example of a list of music piece titles;

FIG. 12A is a diagram showing a state where a position to input a head in case of performing a batch paste of a plurality of character information described in the music piece title list was designated;

FIG. 12B is a diagram showing a state where the batch paste of the plurality of character information described in the music piece title list was performed;

FIG. 12C is a diagram showing a state where the music piece title list to batch paste the plurality of described character information was selected;

FIG. 13A is a schematic diagram showing an example of a display of a homepage in which CD titles are displayed;

FIG. 13B is a schematic diagram showing a state where the music piece title list to be subjected to the copy & paste was selected in an example of a display of a homepage in which the CD titles are displayed;

FIG. 14 is a schematic diagram showing an example of a description of an HTML file in the display of the music piece title list;

DETAILED DESCRIPTION OF THE PREFERRED EMBODIMENT

Figure 1:
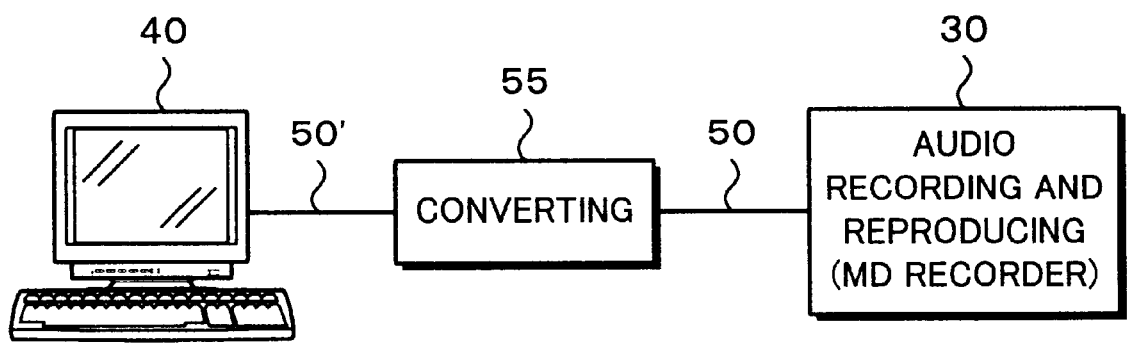
FIG. 1 is a schematic diagram showing an example of a connection form of each apparatus in a preferred embodiment of the invention.

A preferred embodiment of the invention will now be described hereinbelow with reference to the drawings. FIG. 1 shows an example of a connection form of each apparatus in the preferred embodiment of the invention. A predetermined interface to input and output digital data is provided for an MD (Mini Disc®) recorder 30 that is used as an audio recording and reproducing apparatus. The MD recorder 30 and a converter 55 are connected through a communication path 50 by using such an interface. The converter 55 and a personal computer 40 are connected via a communication path 50'.

As a data communication standard in the personal computer 40, for instance, RS (Recommended Standard)—232C, SCSI (Small Computer System Interface), or the like can be used. The converter 55 is provided to absorb a difference of formats of control signals between the data communication standard on the personal computer 40 side and a data communication standard on the MD recorder 30 side. In the personal computer 40. by using an IEEE (Institute of Electrical and Electronic Engineers) 1394 as a data communication standard, corresponding interface is provided for the MD recorder 30, so that a direct connection between the personal computer 40 and MD recorder 30 can be easily realized.

Figure 2:
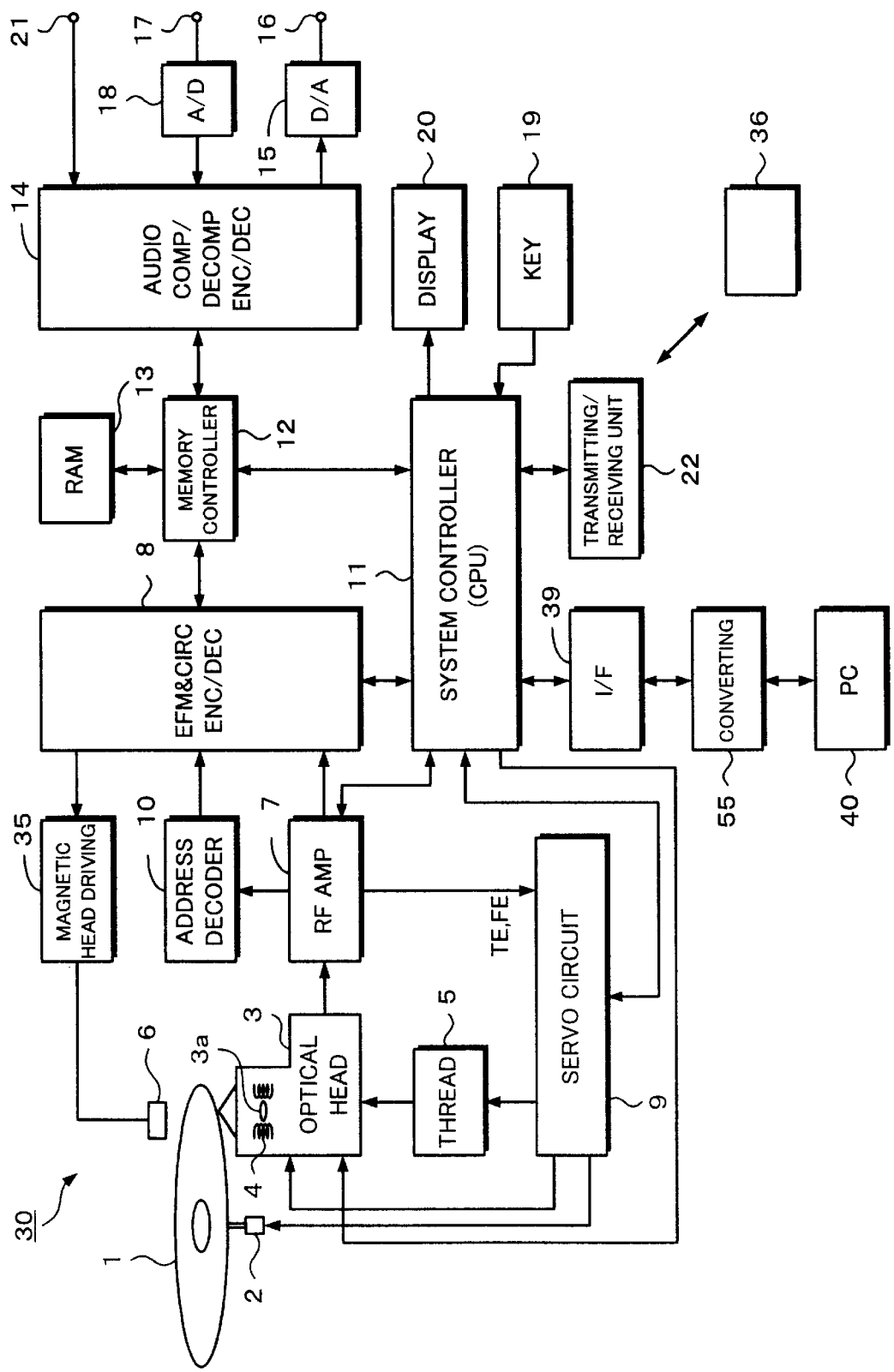
FIG. 2 is a block diagram showing an example of a construction of an MD recorder.

FIG. 2 shows an example of a construction of the MD recorder 30. A disc 1 (mini disc in this example) is enclosed in a cartridge having a shutter mechanism. By opening or closing the shutter mechanism upon recording and reproduction, light emitted from an optical pickup can be irradiated to the disc 1 and a magnetic field from a magnetic head can be applied to the disc 1. Upon recording and reproduction, the disc 1 is loaded into the MD recorder 30 and is rotated by a spindle motor 2 at a CLV (Constant Linear Velocity). An optical head 3 and a magnetic head 6 are provided at positions which face so as to sandwich the disc 1. The whole optical head 3 is largely moved in the radial direction of the disc 1 by a thread motor 5.

The optical head 3 is constructed by an objective lens 3$a$, a biaxial mechanism 4, a semiconductor laser (not shown), and a photosensing unit (not shown). An intensity of a laser beam emitted from the semiconductor laser is switched in the recording mode and the reproducing mode. The photosensing unit usually comprises a plurality of areas, receives the reflection light in which the laser beam emitted from the semiconductor laser was reflected by the disc 1, and generates a detection signal every area. A plane of polarization of the reflection light changes in accordance with the recording information by a magnetic Kerr effect. The photosensing unit detects a magnetic field vector on the basis of a change in plane of polarization and generates a detection signal on the basis of the detected magnetic field vector. The biaxial mechanism 4 is constructed by: a focusing coil to drive the objective lens 3$a$ in the direction where the lens is come into contact with or away from the recording surface of the disc 1: and a tracking coil to drive the objective lens 3$a$ in the radial direction of the disc 1.

A construction and the operation regarding processes based on a reproduction signal of a data reproducing system, a servo system, or the like will now be described. The above detection signal formed by the photosensing unit in the optical head 3 is supplied to an RF (Radio Frequency) amplifier 7. In the RF amplifier 7, a focusing error signal FE, a tracking error signal TE, an RF signal, and a spindle error signal are formed on the basis of the detection signal. Among them, the signals FE and TE are supplied to a servo circuit 9. The RF signal is supplied to an EFM (Eight to Fourteen Modulation) and CIRC (Cross Interleave Reed-Solomon Coding) encoder and decoder 8 and an address decoder 10. Further, the spindle error signal is supplied to a system controller 11.

The servo circuit 9 performs a phase compensation and a gain control to a signal that is supplied from the RF amplifier 7. An output of the servo circuit 9 is supplied to a focusing coil and a tracking coil in the biaxial mechanism 4 via driving amplifiers (not shown).

Further, the tracking error signal TE is supplied to an LPF (Low Pass Filter) (not shown) in the servo circuit 9. On the basis of an output of the LPF, a thread error signal is formed. The thread error signal is supplied to the thread motor 5 through a thread driving amplifier (not shown). The thread motor 5 is operated in response to the thread error signal.

The RF signal is supplied from the RF amplifier 7 to the EFM & CIRC encoder and decoder 8. In the EFM & CIRC encoder and decoder 8, the RF signal is binarized and is subjected to an EFM demodulation in correspondence to the EFM (Eight to Fourteen Modulation) performed to the recording data. Further, an error correcting process based on the CIRC as a coding performed to the recording information is performed to this signal.

In the EFM & CIRC encoder and decoder 8, a spindle error signal to control the rotation of the disc 1 is formed on the basis of the binary signal based on the RF signal or address data that is extracted by the address decoder 10. The formed spindle error signal is supplied to the system controller 11 and the spindle motor 2 is controlled on the basis of this signal. Further, in the EFM & CIRC encoder and decoder 8, the pull-in operation of the built-in PLL (Phase Locked Loop) is controlled on the basis of the binarized EFM signal.

An output of the EFM & CIRC encoder and decoder 8 is written into a memory 13 via a memory controller 12. The writing operation of the data into the memory 13 and the reading operation of the data from the memory 13 are controlled by the memory controller 12. The memory controller 12 is controlled by the system controller 11.

The signal read out from the memory 13 is supplied to an audio compression encoder and audio decompression decoder 14 and the compression performed to the signal by, for example, the ATRAC (Acoustic TRansferred Adopted Coding) system is decoded. The decompressed signal is converted into an analog audio signal by a D/A converter 15 and is supplied to audio signal output unit (not shown) through an audio output terminal 16.

As will be explained hereinlater, a groove wobbled at a predetermined frequency of, for example, 22.05 Hz has previously been formed on the disc 1. Address data is recorded by an FM (Frequency Modulation) modulation. The address data is extracted by the address decoder 10 on the basis of the RF signal which is supplied from the RF amplifier 7. In the address decoder 10, the supplied RF signal is frequency demodulated via a built-in BPF (Band Pass Filter) and the address data is extracted. The extracted address data is supplied to the EFM & CIRC encoder and decoder 8.

Processes which are executed by the memory controller 12 will now be described in more detail. An output signal of the EFM & CIRC encoder and decoder 8 is written into the memory 13 at a transfer rate of, for example, 1.4 Mbits/sec. When the signal of a predetermined amount or more is accumulated in the memory 13, the data is read out at a transfer rate of 0.3 Mbits/sec that is sufficiently slower than the transfer rate upon writing. As mentioned above, since after the reproduced signal was once stored into the memory 13, it is outputted as audio data, a sound skip caused by a track jump or the like due to a disturbance is prevented.

That is, for instance, when a track jump occurs due to a disturbance such as a vibration or the like, the optical head 3 is rearranged to an address where the track jump occurred. Even for a period of time that is required for this process, the audio signal is outputted on the basis of the signal which has already been written in the memory 13 by the process of the memory controller 12 mentioned above. Therefore, even if the reproduction from the disc 1 is interrupted due to the track jump, so long as the interruption period is equal to or shorter than a predetermined time, the audio output is not interrupted. For example, in case of using an RAM of 4 Mbytes as a memory 13, in a state where the data in the memory 13 is full, data corresponding to the audio data output of about 10 seconds is stored.

A construction and the operation regarding the recording will now be described. An analog audio signal is supplied to an A/D (Analog to Digital) converter 18 via an analog audio input terminal 17. The analog audio signal is converted into a digital signal by the A/D converter 18 and supplied to the audio compression encoder and audio decompression decoder 14. Digital audio signal can be also directly supplied from a terminal 21 to the audio compression encoder and audio decompression decoder 14.

The digital signal supplied to the audio compression encoder and audio decompression decoder 14 is subjected to a compressing process by, for example, the ATRAC system, is transferred at a transfer rate of 0.3 Mbits/sec or the like, and is once stored into the memory 13 via the memory controller 12. The memory controller 12 permits the reading operation from the memory 13 when it is detected that a predetermined amount of digital signal has been stored in the memory 13.

The digital signal read out from the memory 13 is supplied to the EFM & CIRC encoder and decoder 8, is subjected to the EFM and the CIRC coding for error correction, and is supplied to a magnetic head driving circuit 35. In the magnetic head driving circuit 35, the driving of the N pole or S pole of the magnetic head 6 is performed on the basis of the supplied signal. Further, an emitting power of the semiconductor laser in the optical head 3 is controlled so as to be higher than that upon reproduction. Further, the surface of the disc 1 is heated to a Curie temperature, it is set into a state where a magnetic inversion can occur, and data is recorded.

The system controller 11 is constructed by, for example, a CPU (Central Processing Unit) and performs various controls regarding the operations such as recording, reproduction, and the like. For example, in the system controller 11, a control of signal processes which are performed by the memory controller 12 by using the memory 13, a spindle control based on the spindle error signal which is supplied from the EFM & CIRC encoder and decoder 8, and an encoder & decoder control for the EFM & CIRC encoder and decoder 8 are performed.

A transmitting/receiving unit 22 to transmit and receive, for example, an infrared signal is connected to the system controller 11. The control signal supplied from the system controller 11 to the transmitting/receiving unit 22 is modulated to an infrared signal and is transmitted. The transmitted infrared signal is received to a remote control commander 36 having transmitting and receiving functions of, for example, the infrared signal in a manner similar to the above. The remote control commander 36 has, for example, a predetermined display function and allows a display to be performed on the basis of the received signal. The infrared signal based on the operation of the user is transmitted from the remote control commander 36 and is received to the transmitting/receiving unit 22. The signal received in the transmitting/receiving unit 22 is converted into a predetermined control signal and supplies it to the system controller 11. The system controller 11 supplies a control signal to each section in the MD recorder 30 on the basis of the supplied signal.

Figure 3:
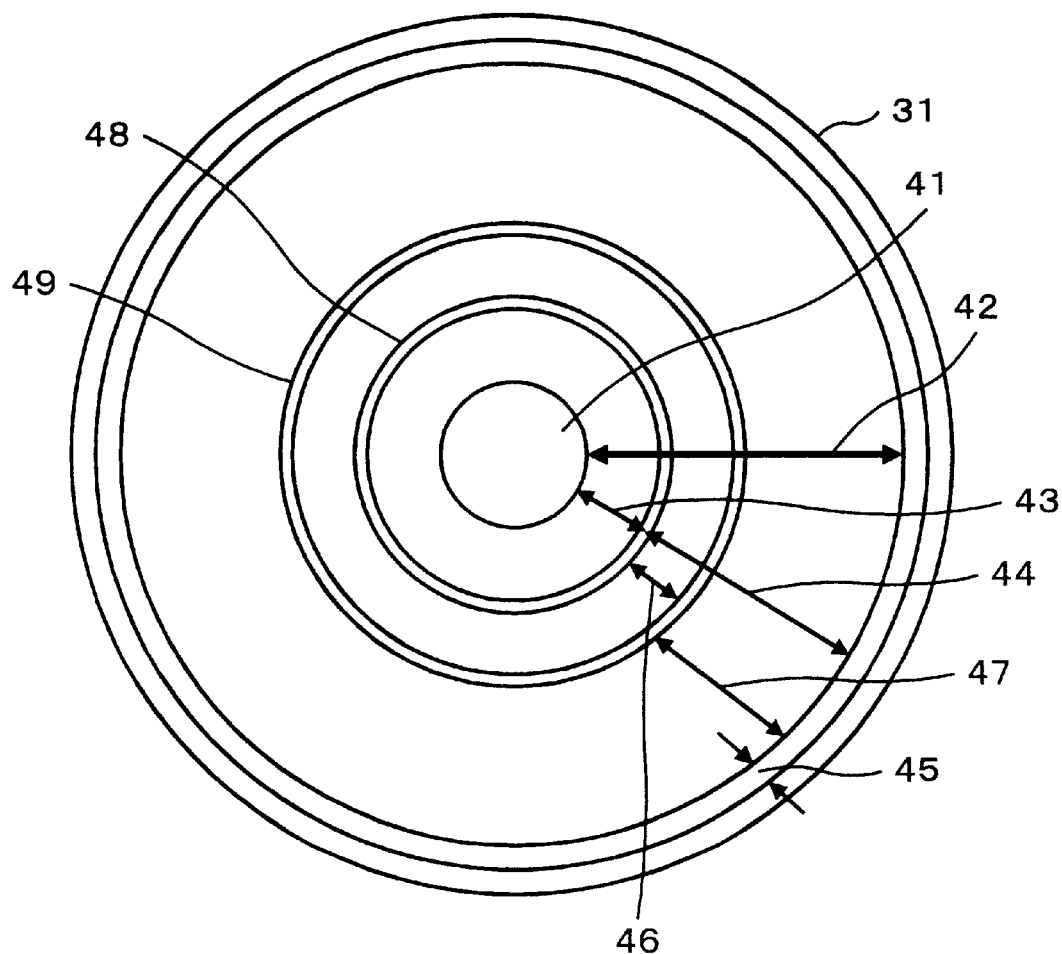
FIG. 3 is a schematic diagram conceptually showing a memory area of a mini disc.

A medium format of the disc 1 as a mini disc will now be described. FIG. 3 schematically shows a recording area of the disc 1. An information film is attached onto a polycarbonate substrate and a clamping plate 41 made of a magnetic material is attached to the center. The information film comprises a recording film and a read only film. The recording film in the information film has a structure in which a dielectric layer, an MO layer, a dielectric layer, a reflecting film, and a protecting film are laminated in accordance with this order from the polycarbonate substrate side. The read only film in the information film comprises a reflecting film and a protecting film. An area of the information film excluding the clamping plate 41 of the disc 1 is set to an information area 42.

The innermost rim side of the information area 42 is set to a lead-in area 43. A read only film is attached to the lead-in area 43 and information has previously been recorded in a form of pit. A recordable area 44 to which the recording film has been attached is provided on the outside of the lead-in area 43. Further, a lead-out area 45 is provided on the outermost rim side of the disc 1. A program area 47 to record a program is arranged on the outside of the recordable area 44. On the inner rim side of the recordable area 44, a U-TOC area 46 to record the U-TOC (User—Table Of Contents) is arranged and information regarding each program recorded in the program area 47 is recorded in the U-TOC area 46.

A calibration area 48 is provided between the lead-in area 43 and U-TOC area 46, namely, on the innermost rim of the recordable area 44. A gap area 49 is provided between the U-TOC area 46 and program area 47. User data is not recorded in the calibration area 48 and gap area 49. The calibration area 48 is provided for adjustment or the like of the laser power upon recording.

P-TOC (Pre-mastered—Table Of Contents) has preliminarily recorded as prepits in the lead-in area 43. A start address and an end address of each music piece of the disc, a track name as a name of the music piece, a disc name as a name of the disc, and the like have been recorded in the P-TOC.

To perform the recording or reproducing operation to the disc 1, it is necessary to previously read out the P-TOC and U-TOC as management information recorded on the disc 1. The system controller 11 discriminates an address of the area to be recorded on the disc 1 and an address of the area to be reproduced in accordance with the management information. The management information is read out and is stored into a memory (not shown) when the disc 1 is loaded. The management information is referred in the subsequent recording or reproducing operation.

The U-TOC is edited and rewritten in accordance with the recording and erasure of data. The system controller 11 performs the editing process to the U-TOC in the memory each time the recording or erasing operation is executed. The U-TOC renewed as a result of the editing process is written into the U-TOC area 46 of the disc 1 at a predetermined timing, for example, in response to an ejection command of the disc 1 or a command to turn off the power source. The invention is not limited to the above method but the contents in the U-TOC area 46 of the disc 1 can be also directly rerecorded each time the rewriting is performed.

Figure 16:
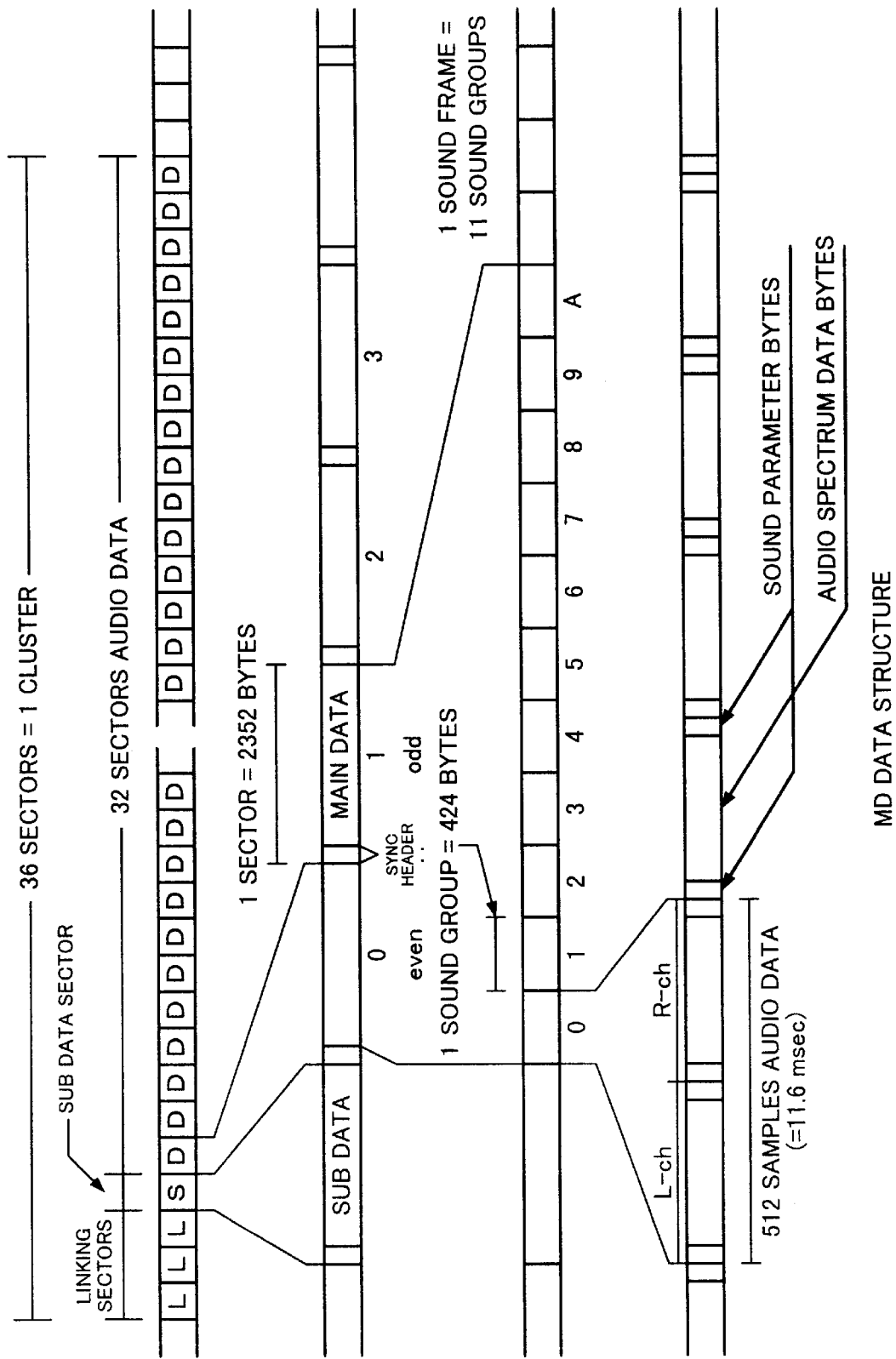
FIG. 16 is a schematic diagram conceptually showing a data structure of a mini disc.

A data structure in the program area 47 shown in FIG. 16 will now be described. The recording and reproduction of data are executed on a cluster unit basis. One cluster is constructed by, for instance, 36 sectors. One sector consists of, for example, 2352 bytes. Among 36 sectors constructing one cluster, three sectors are linking sectors and one sector is a subdata sector. Further, main data is recorded in the other 32 sectors.

An interleave length of the CIRC in an example of the data format of the mini disc is set to a value longer than a 1-sector length (for example, 13.3 msec) in the format generally used in, for instance, the CD or the like. The above linking sector is, therefore, provided to have a compatibility of the reproducing system, namely, a function such that both of the CD and the MD can be reproduced by the same reproducing system. Therefore, useful information is not recorded in the linking sector. The subdata sector is an extended area and no information is recorded at the present stage.

One sound frame is defined for the above sectors on the basis of two sectors. One sound frame is divided into, for example, 11 sound groups. One sound group consists of, for example, 424 bytes and is constructed by data of right and left channels. A difference between ½ of the sound frame of 2332 bytes and one sector of 2352 bytes corresponds to a sync signal, a header signal, or the like for sector identification.

As mentioned above, the U-TOC is index information to manage each program recorded in the program area 47. The U-TOC is recorded in the U-TOC area 46. The U-TOC is recorded in the U-TOC area 46 consisting of, for example, 32 sectors. The sector 0, sector 1, and sector 4 will now be described hereinbelow.

First, in the sector 0, a start address, an end address, copy protect information, emphasis information, and the like of each program recorded in the program area 47 are managed. FIG. 4 shows one constructional example of the sector 0. Each of the sector 0 and the sectors 1, 2, and 4, which will be explained hereinlater, has a size of 2352 bytes and has a construction in which 588 slot units each consisting of 4 bytes are arranged. Numbers 0 to 587 are allocated to the slot units each consisting of four bytes in order to distinguish them. Subsequent to a header portion, two bytes called a cluster H and a cluster L to show a predetermined address position, a maker code and a model code showing a manufacturer source and a type of the disc, First TNO (Track Number) and Last TNO to show the first and last program numbers, a sector use situation (used sectors), a disc serial number, a disc ID (Identification), and the like are sequentially recorded.

A correspondence table instruction data portion constructed by P-DFA (Pointer for Defective Area) showing the head position of a slot to store information regarding a position of a defect occurring on the disc 1, P-EMPTY (Pointer for Empty slot) showing a use situation of the slot, P-FRA (Pointer for FRee Area) showing the head position of the slot to manage a recordable area, and P-TNO1, P-TNO2, . . . , P-TNO255 each showing the head position of the slot corresponding to each program number is recorded.

The foregoing 255 slots to store the information regarding the positions of the defects occurring on the disc are provided in the numbers 78 to 587 to distinguish the slot units. Each slot consists of four bytes. A start address, an end address, a track mode, and link information are managed in one slot.

The MD reproducing and recording apparatus to which the invention can be applied is not always necessary to sequentially record the data onto an MD as a recording medium and can also correctly reproduce the data which has discretely been recorded on the recording medium. Processes for this purpose will now be described hereinbelow. First, as mentioned above, since the data is once stored in the memory RAM 13 shown in FIG. 2 and the writing rate to the memory RAM 13 is set to be higher than the reading rate from the memory RAM 13, the following data processes can be performed in the reproducing system.

The reproduction data formed by the EFM & CIRC encoder and decoder 8 is stored into the memory RAM 13 on the basis of the reproduction signal which is obtained by allowing the optical pickup to sequentially access to the data which has discretely been recorded on the disc is stored into the memory RAM 13. When the data is read out from the memory RAM 13, the data is rearranged to a sequential form and is outputted to the audio compression encoder and audio decompression decoder 14 at the post stage.

In addition to the above data processes, processes which are executed with reference to the foregoing P-FRA in the sector 0 of the U-TOC in order to correctly combine the data which was discretely recorded will now be described. FIGS. 5A to 5E are diagrams showing an example of a case where 03h has been recorded in P-FRA. h denotes a hexadecimal notation. In this case, first, the slot 03h is accessed as shown in FIG. 5A. The start address data and end address data recorded in the slot 03h indicate a start address and an end address of one part recorded on the disc.

The link information recorded in the slot 03h shows an address of a slot to be subsequent. In FIG. 5A, an address to be subsequent is 18h. Therefore, a slot 18h is accessed as shown in FIG. 5B. Since the link information recorded in slot 18h shows that the address of the slot to be subsequent is 1Fh, as shown in FIG. 5C, a slot 1Fh is further accessed. As shown in FIG. 5D, a slot 2Bh is accessed in accordance with link information of the slot 1Fh. In accordance with link information of a slot 2Bh as shown in FIG. 5E, a slot E3h is accessed. As mentioned above, the link information is sequentially traced until null (namely, 00h) appears as link information.

By tracing the link information as mentioned above, the addresses of the data discretely recorded on the disc 1 are sequentially recognized. By sequentially accessing to those addresses on the disc 1, the data discretely recorded can be combined upon reading from the memory RAM 13.

The above description has been made with respect to the process for combining the data discretely recorded with reference to P-FRA. However, the data which has discretely been recorded can be also similarly combined even by referring to P-DFA, P-EMPTY, P-TNO1, P-TNO2, . . . , and P-TNO255.

FIG. 6 shows an example of a construction of the U-TOC sector 1. In the sector 1 of the U-TOC area 46, a title of each program recorded in the program area 47 and a title of the whole disc 1 are managed. The title of the whole disc 1 denotes information such as album title, name of player, and the like in the case where the programs which are recorded are audio data. The title of each program denotes, for example, a title of a music piece.

The character information of each program is recorded in the slot of a character table portion instructed by correspondence table instruction data P-TNA$_x$. However, X is set to a value within a range of 1 to 255. When the number of characters is large, a plurality of slots are connected by using the link information and the recording is performed. In the U-TOC sector 1, since the character codes which can be used have been predetermined, the title inputted by alphabets is mainly managed. For example, in the sector 1, the character information is managed by the ASCII code.

When a half size Katakana input is instructed by the user, a special code "^" is automatically generated and the alphabet character is surrounded and managed in the sector 1. In this case, the alphabet surrounded by the special code "^" is converted into Katakana on the basis of a predetermined conversion table and is displayed. By the conversion table, for example, a character of "^a^" is converted into "ア" of Katakana.

FIG. 7 shows an example of the sector 4. By the character code decided to be used in the sector 4, the title of each program recorded in the program area 47 can be expressed by Kanji, Hiragana, or Katakana. In the sector 4, for example, the character information is managed by the character code or shift JIS code by ISO-8859-01.

In the above example, as for the character form, it is assumed that alphabet and Kanji and Hiragana of Japanese are distinguished. However, it is also considered to divide the sectors and to manage between the alphabetic characters and the characters of various languages, mainly, in Europe such as French, Italian, Spanish, and the like having peculiar accent symbols or the like although alphabetic characters are used.

It is also considered to discriminate alphabet and the characters of China having characters similar to Japanese or the characters of various languages in the world like Hangul or the like having characters different from Japanese. Further, the discrimination in the case where both characters are not the alphabetic characters can be also performed by a method whereby a special code is added to ones of the two kinds of characters and those characters are managed in the sector 1 and the other characters are managed in the sector 4 or the like.

FIG. 8 shows an example of a construction of the personal computer 40. A CPU 62 is connected to a bus 60 via a memory and bus controller 61. Similarly, an ROM 63 and an RAM 64 are connected to the bus 60 via the memory and bus controller 61. Fundamental software to make the personal computer 40 operative has preliminarily stored in the ROM 63. The RAM 64 is used as a work area and a temporary data storing location of the CPU 62.

An input and output controller 65 is connected to the bus 60. Input devices which are used as user interfaces such as a keyboard 68 and a mouse 69 to input data from the outside, for example, to input data on the basis of the operation of the user are connected to the I/O controller 65. Those input devices are shown as examples. For instance, devices such as tablet, touch panel, joystick, and the like to input by other methods can be also connected. Although not shown, a floppy disk drive or the like is also connected to the I/O controller 65.

An interface 66 to communicate data to/from external equipment is also connected to the I/O controller 65. As an interface 66, for example, the RS-232C or SCSI (Small Computer System Interface) can be used as a data communication standard. Data can be bidirectionally transmitted. The data communication standard by the standard of IEEE1394 can be also used as an interface 66. The interface 66 and MD recorder 30 are connected via the converter 55.

If the data communication standard according to IEEE1394 is used and the MD recorder 30 corresponds to this standard, the converter 55 can be omitted and the interface 66 and MD recorder 30 can be directly connected. In addition to it, by using the IEEE1394 standard, music data can be also transmitted between the MD recorder 30 and personal computer 40. Besides IEEE1394, USB (Universal Serial Bus) can be also used as a data communication standard between the MD recorder 30 and personal computer 40.

A modem 74 besides the above devices is also connected to the I/O controller 65. By using the modem 74 in the personal computer 40, a communication with the outside can be performed through a telephone line or the like on the basis of a predetermined protocol. The modem 74 acting as a receiving means for receiving character information stored in an outside server. For example, it is possible to connect to the internet via the telephone line by the modem 74.

Further, a CD-ROM (Compact Disc—Read Only Memory) drive 70 and a hard disc drive 71 are connected to the bus 60. Programs and data are stored into the hard disc drive 71 and this drive is also used as a work area of the CPU 62. A display 73 is connected to the bus 60 via a graphic adapter 72. Drawing data formed by the CPU 62 is supplied to the graphic adapter 72 via the bus 60, is used as data which can be displayed by the display 73, and is displayed by the display 73.

For example, a floppy disk in which desired software has been recorded is installed in the floppy disk drive or a CD-ROM in which desired software has been recorded is installed in the CD-ROM drive, so that the desired software is read out and operations, which will be explained hereinlater, are executed.

For example, the following construction is included in the desired software.

(i) GUI (Graphic User Interface) to display information from a computer communication network onto the screen (ii) Operation application to select desired character information by performing a copy & paste from the displayed character information (iii) Application to convert the desired character information to a data communication system based on, for example, the IEEE1394 standard in order to transmit it to equipment such as an MD recorder 30 or the like The above desired software can be also preliminarily stored in a program storing device such as a memory built in the personal computer or a hard disc drive or the like.

By performing a predetermined operation by the input device such as keyboard 68, mouse 69, or the like mentioned above on the basis of the display of the display 73, an instruction can be made to the software. This operation is performed by designating a predetermined area on the screen by, for example, a pointer which is moved in correspondence to the motion of the mouse 69. The above series of operations is referred to as "operation" hereinbelow.

In the preferred embodiment of the invention, the character information inputted by using the user interface such as a keyboard 68 or the like in the personal computer 40 is transmitted to the MD recorder 30 through the interface 66 and can be recorded to, for instance, the U-TOC of the disc 1. In this instance, as data that is supplied from the personal computer 40 to the MD recorder 30, a control signal as a recording command (namely, write command), a writing position (namely, write address), character data as contents to be written, and write character control information are necessary.

The write character control information is fundamentally information to identify an end position of the character data that is transmitted by an arbitrary length. For example, a method of including information indicative of a length of character data which is transmitted to write or a method of including flag information showing the end of character data by adding "0" or the like to the end of the character data is considered. A special code can be also decided as write character control information.

As mentioned above, two areas of the sector 1 and sector 4 exist in the U-TOC with respect to the character input. Therefore, in the above transmission data, as for the writing position, namely, write address data, the correspondence information of the sectors 1 and 4 is included.

If information to identify the equipment on the transmission destination side or transmission source side, information to identify the kind of transmission format, information to identify the kind of character in the character information, and the like are added to the data to be transmitted, more detailed information can be transmitted and it is more preferable.

Although the example of writing the character information has been described above, a control signal other than the write command can be also transmitted to the MD recorder 30. For instance, by transmitting a control signal to control the operation of the MD recorder 30 from the personal computer 40 to the MD recorder 30, the MD recorder 30 can be operated by the personal computer 40.

In the above construction, for example, an MD (Mini Disc) on which a plurality of music data has previously recorded is set into the MD recorder 30 and the U-TOC information is read out. A predetermined data communication is performed between the MD recorder 30 and personal computer 40 via the communication paths 50 and 50' and converter 55 and the read-out U-TOC information is transferred to the personal computer 40.

That is, the character information read out from the U-TOC or the like of the disc 1, namely, the music piece name information and disc information recorded on the disc 1 or information such as a recording time and the like is transferred to the personal computer 40 via the interface 66. The transferred information is processed in the CPU 62 in accordance with predetermined software and is displayed by the display 73 through the graphic adapter 72.

The writing position, namely, write address of the character information has to be determined at the stage where the data is outputted from the personal computer 40. Therefore, at the stage of inputting the character information on the personal computer 40, it is necessary to designate the writing position, namely, write address of the input character. In the embodiment of the invention, it can be designated by a window 80 shown as an example in FIG. 9 by using the GUI (Graphic User Interface) in the personal computer 40.

Figure 9:
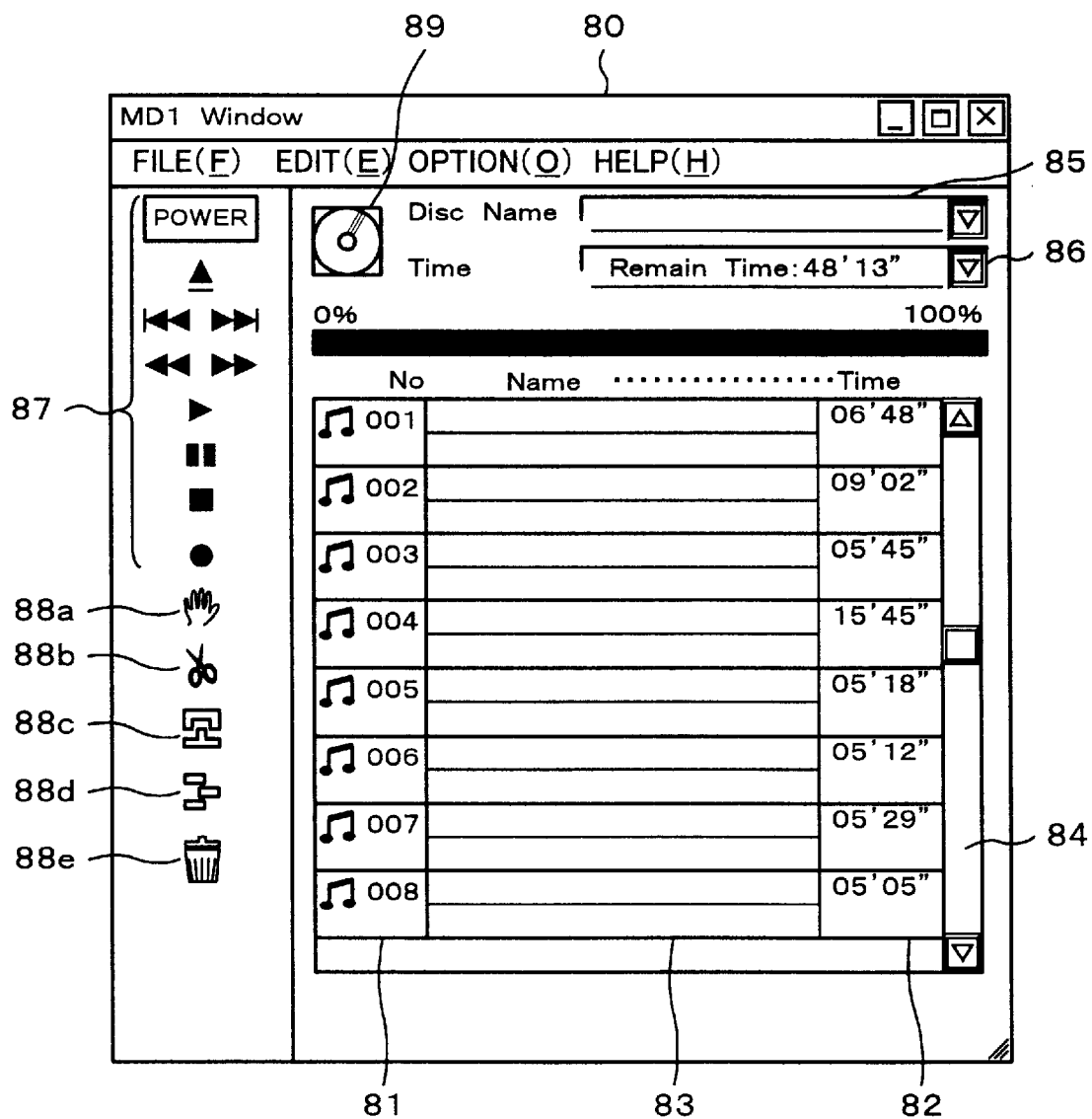
FIG. 9 is a schematic diagram showing an example of a window display to input character information of each track of the MD.

FIG. 9 shows an example of a display of the window 80.

A track number is displayed in a track number column 81. A length, namely, playing time of music data recorded in each track is displayed in a time display column 82. A name input column 83 is a column to display and edit character information such as a title and the like of the track corresponding to the track number. In the example of FIG. 9, since the character information corresponding to each track is not recorded to the disc 1, nothing is displayed in the name input column 83. By designating a column corresponding to a desired track of the name input column 83 and inputting a character train, a name can be labeled to the track. The character information which is inputted to the name input column 83 is not limited to the name.

In the personal computer 40, a list of the track information of the disc 1 is displayed on the basis of the transferred U-TOC information. It is assumed that the title information of each track is not inputted yet. Therefore, a plurality of blank columns corresponding to a plurality of tracks are displayed in the name input column 83.

When the number of tracks formed on the disc 1 is large and all of them cannot be displayed in a predetermined area, by operating a scroll bar 84, a hidden portion can be displayed.

A disc name allocated to the disc 1 and recorded in the U-TOC is displayed in a disc name column 85. A remaining time at which music data can be further recorded in the disc 1 is displayed in a remaining time display column 86.

Various buttons 87 to operate the MD recorder 30 from the personal computer 40 are arranged on the left side of the window 80. By operating a desired one of the buttons 87, a control signal corresponding to the operated button 87 is transferred from the personal computer 40 to the MD recorder 30 and the MD recorder 30 is controlled. For example, by operating the button which is arranged at the upper position and on which "POWER" is written, a power source of the MD recorder 30 can be ON/OFF controlled.

Similarly, various icons 88a, 88b, 88c, 88d, and 88e to edit on a track, namely, music piece unit basis are arranged on the left side of the window 80. The icon 88a is used to instruct the movement of a music piece. The order of music pieces can be changed by the icon 88a. The icon 88b is used to instruct the division of a music piece. The icon 88c is used to instruct a coupling of two music pieces. The icon 88d is used to instruct the erasure of a part of a music piece. The icon 88e is used to instruct the deletion, namely, erasure of a music piece. By using those icons for edition, an editing operation can be performed to a plurality of music pieces shown in the window of FIG. 9.

In the window 80, by inputting characters into the name input column 83 and performing a predetermined operation, the inputted information can be transferred from the personal computer 40 to the MD recorder 30.

In the invention, as an inputting method of character information, besides the method of using the edition picture plane by the window 80, the character information can be easily inputted by using the character information formed by another application software.

An example of using the character information formed by another application software will now be described hereinbelow. In the personal computer 40, a list of music piece titles of the disc 1 set in the MD recorder 30 is formed by using character train edition application software such as a text editor or word processor. FIG. 10 shows an example of a formed music piece title list 90. Music piece titles are inputted as title information corresponding to each track. The music piece titles using Hiragana and Kanji are inputted to the upper position every track. The music piece titles using alphabet are inputted to the lower position. For example, a carriage return [CR] as a control symbol for a new line is inputted to the end of each music piece title data. The control symbol [CR] is not actually displayed or is displayed by, for example, a symbol like an arrow.

Generally, on the personal computer, data displayed on certain software can be selected and stored and can be displayed or stored onto another software. For example, a character train displayed on certain character train edition application software can be selected and temporarily stored in a predetermined area in the memory and can be displayed or stored onto another application software.

The above process is usually called a "copy & paste" and a similar process in which no data remains on the selecting source side is called a "cut & paste". Since the "copy & paste" and "cut & paste" can present a similar effect in software on the paste destination side, explanation will be made hereinbelow with respect to the "copy & paste" as a representative. By performing the above operation, even if a character input is not performed from the keyboard 68, a large amount of character information can be performed in a lump by using character information or the like which has previously been formed.

Figures 11A, 11C:
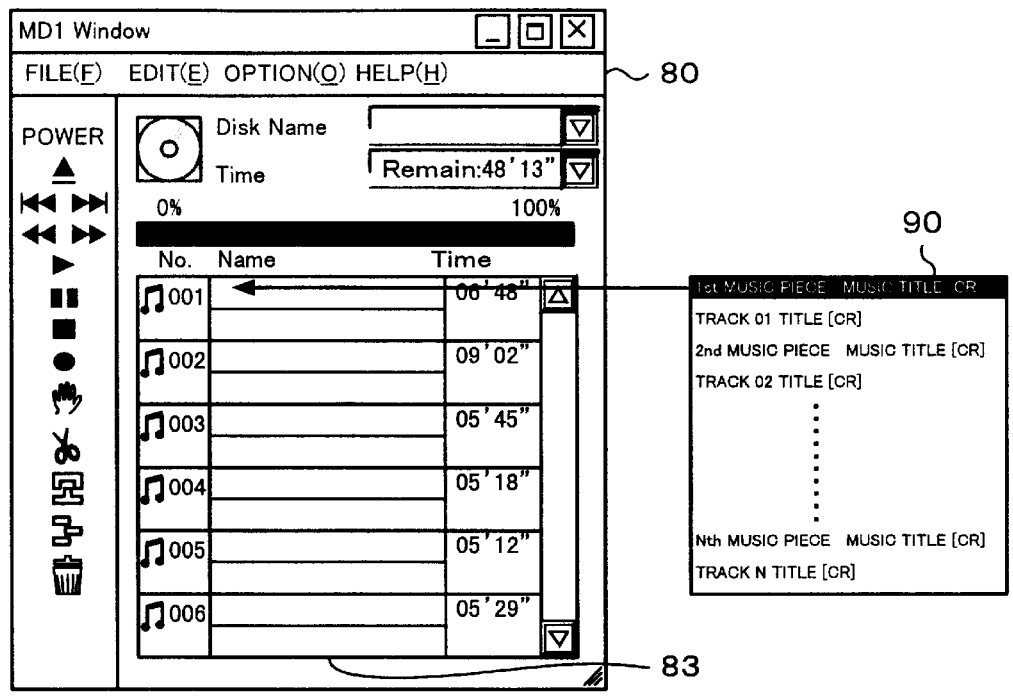
FIG. 11A is a diagram showing a state where a name input column of a window in which character information is inputted was designated by using a copy & paste.
FIG. 11C is a diagram showing a state where list of music piece titles to be inputted to the name input column of the window was selected by using the copy & paste.
Figure 11B:
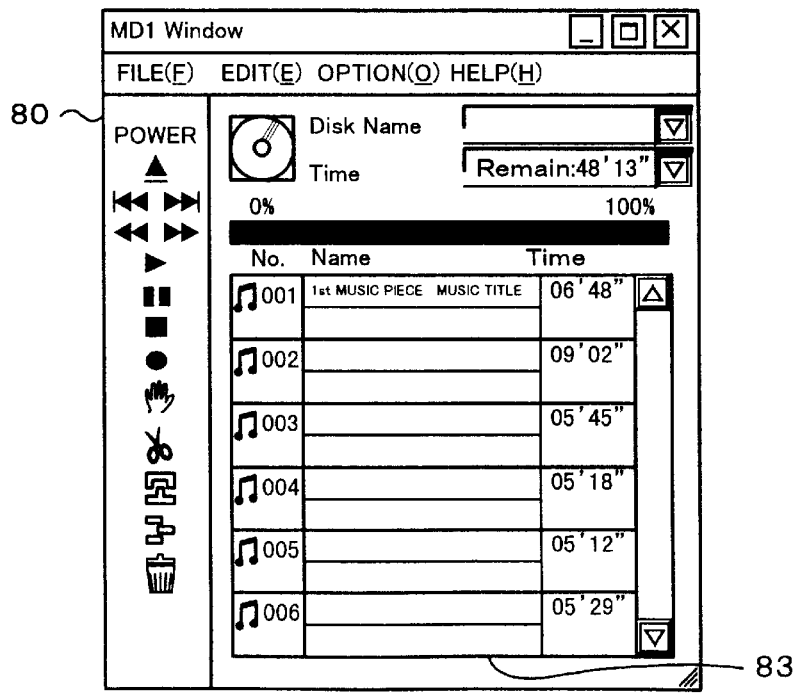
FIG. 11B is a diagram showing a state where the character information was inputted to the name input column of the window by using the copy & paste.

In the preferred embodiment of the invention, the character information can be inputted to the name input column 83 in the window 80 by using the copy & paste. First, an example in which the character information described in the music piece title list 90 is selected and inputted one line by one will be described. For instance, as shown in an example in FIGS. 11A, 11B, and 11C, one line is selected from the music piece title list 90 shown on the right side of FIG. 11A and is copied. In the name input column 83 in the window 80, a position to input the copied character information is designated. By performing the paste operation after that, the character information copied to the designated position is pasted. As shown in FIG. 11B, thus, the character information pasted to the relevant position is inputted and displayed.

According to the preferred embodiment of the invention, a plurality of lines described in the music piece title list 90 can be copied & pasted in a lump. In the music piece title list 90, to designate a boundary of every data, a predetermined control symbol is inserted. On the window 80, by identifying the control symbol as a boundary of the recording positions in the name input column 83, each data can be pasted to a predetermined position in the name input column 83.

FIGS. 12A, 12B, and 12C show an example in which a plurality of character information described in the music piece title list is pasted in a lump. As shown on the right side of FIG. 12A, a plurality of lines are selected and copied in a lump in the music piece title list 90. In the name input column 83 of the window 80, positions where the heads of the copied character information of a plurality of lines are inputted are designated. By performing the paste operation, the copied character information is pasted from the designated positions.

In this instance, a boundary of the tracks in the character information is discriminated by the above control symbol. As shown in FIG. 12B, each column of the name input column 83 is made correspond every control symbol and the character information pasted to the relevant position is displayed every line. According to this method, as compared with the example in which the copy & paste process is executed every line described in the music piece title list 90, the character information can be inputted more easily.

According to the preferred embodiment of the invention, when the character information is pasted to the name input column 83, a format of the character information to be pasted is discriminated and the process to make the character information correspond to the sectors 1 and 4 in the foregoing U-TOC can be automatically performed. For example, by discriminating a boundary of a full size of a 2-byte character or a half size of a 1-byte character of the character information to be pasted, the process to make them correspond to the sectors 1 and 4 can be performed.

From the character information inputted as mentioned above, the position information to be recorded can be automatically obtained by the identification information by the character code. The character information is displayed on the display 73 in a form corresponding to the position information. The character information is transferred to the MD player 30 together with the position information.

In the above example, although the carriage return [CR] has been used as a control symbol to identify the boundary of the character information, the control symbol is not limited to the carriage return [CR]. For example, a half size slash [/] or a full size slash [／] can be used as a control symbol. The control symbol is not limited to a single character but a combination of specific characters can be also used as a control symbol. For instance, a combination of a numeral and a period such as "1. " can be used. Further, a tab symbol can be also used as a control symbol. If a plurality of control symbols are prepared and the user can properly select and use a proper one of them, it is more preferable. Moreover, a control symbol defined by the user can be also used.

Another example of using the character information formed by another application software will now be described. In recent years, for example, a communication network called an Internet has been developed and various contents are developed on this network. The user connects to, for example, Internet by using the modem 74, so that the contents developed on the Internet can be used on the personal computer 40.

As a representative one of the contents which are provided on the Internet, there is a web page. The web page is constructed by an HTML file described by HTML (Hyper-Test Markup Language). The HTML file is put in a WWW server as a server on WWW (World Wide Web) and is opened toward the Internet. For example, predetermined contents are constructed by one or a plurality of web pages and a web page representing the whole construction, namely, a page serving as a front cover is called a homepage. Usually, the web page is generally called a homepage.

To view the HTML file like a homepage, an application called a WWW browser is usually used. The WWW browser reads the designated file in accordance with, for example, a description of inputted URL (Uniform Resource Locators). If an address on the Internet is described as a URL, a file is searched and read out on the Internet. Similarly, a local memory medium, for example, a hard disc of the personal computer in which the WWW browser is operating can be also designated as a URL.

In the HTML, a display control in the WWW browser is performed by a control symbol called a "tag" such that a character train by alphabet is surrounded by a predetermined bracket symbol ("<>"). For instance, a process for a new line is expressed by <BR> in the HTML.

Among homepages, for instance, data such as music piece titles or the like is displayed with respect to a predetermined CD title. As such an example, there is an example in which a sales agency of the CD forms and displays an HTML file for sales promotion, an example in which an HTML file is formed and displayed by each person, or the like. The invention can be also applied to data on the homepage.

For example, a case where the user dubs music data recorded on a commercially available CD onto the disc 1 by using the MD recorder 30 will now be considered. When a dubbing is performed, tracks are formed onto the disc 1 in correspondence to the recorded music pieces of the CD and the music data is recorded. A U-TOC is recorded in correspondence to the formed tracks.

In the personal computer 40, the user connects to the Internet by using, for example, the modem 74. A homepage on which desired data is displayed is searched. FIGS. 13A and 13B show an example of a display of a home page in which CD titles are displayed. The homepage is searched and desired data is displayed to a WWW browser 100 as shown in FIG. 13A. In this example, a CD title 101 and a list 102 of titles of the music pieces recorded in the CD are displayed for the WWW browser 100. Each of the music piece titles corresponds to the track on the CD. In this example, they are displayed by alphabet, namely, ASCII code.

FIG. 14 shows an example of a description of the HTML file to display a music piece title list for the WWW browser 100. Only a portion which is directly concerned with the display is shown. The tag <BR> is described at the end of each line and a new line at that position is instructed. The tag <BR> can be also used as a control symbol to identify the boundary of the tracks. In the character information copied from the WWW browser 100, the tag <BR> is converted to a predetermined control symbol to perform a process for a new line such as a carriage return [CR] or the like.

The control symbol which can be used to identify a boundary of the tracks in the HTML is not limited to the foregoing symbol <BR>. <P> indicative of a process for a new paragraph can be also used as a control symbol. Besides <BR> and <P>, another control symbol to instruct the itemization can be also used. In the character information surrounded by <PRE> to instruct to display a modified text as it is and </PRE>, a boundary can be also identified by a new line symbol that is inserted to the end of each line.

As shown in FIG. 13B, character information which the user wants to input as a music piece title of each of the dubbed music pieces on the disc 1 is selected in a lump. A range 103 shows the character information selected in a lump. Upon selection, for example, an upper left portion of the range 103 is designated by a cursor that is displayed in accordance with a motion of the mouse 69 and the cursor is moved toward the lower edge of the range to be selected as it is. The movement of the cursor in a selecting state is called a "drag".

Figure 15A:
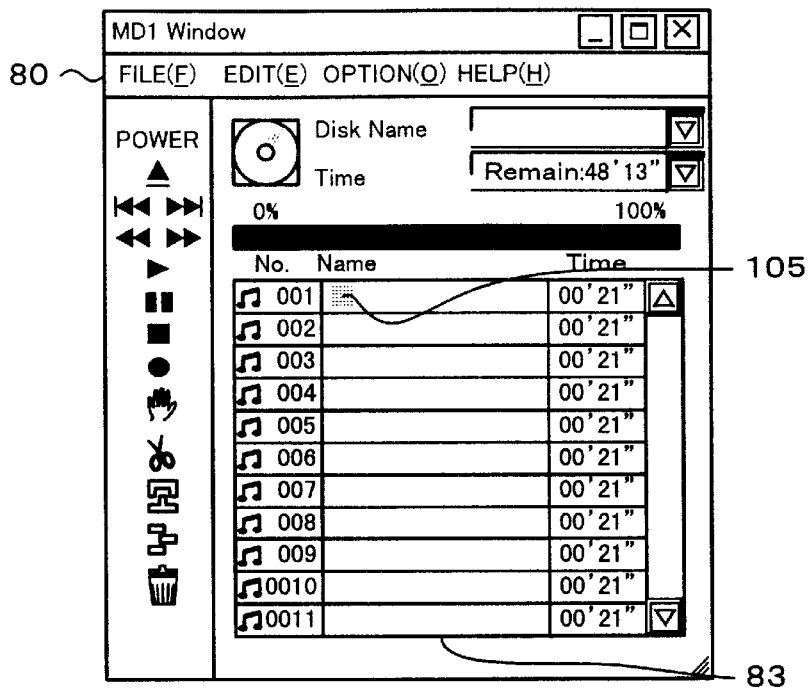
FIG. 15A is a diagram showing a state where a paste start position in case of batch pasting the music piece title list from the homepage was designated.
Figure 15B:
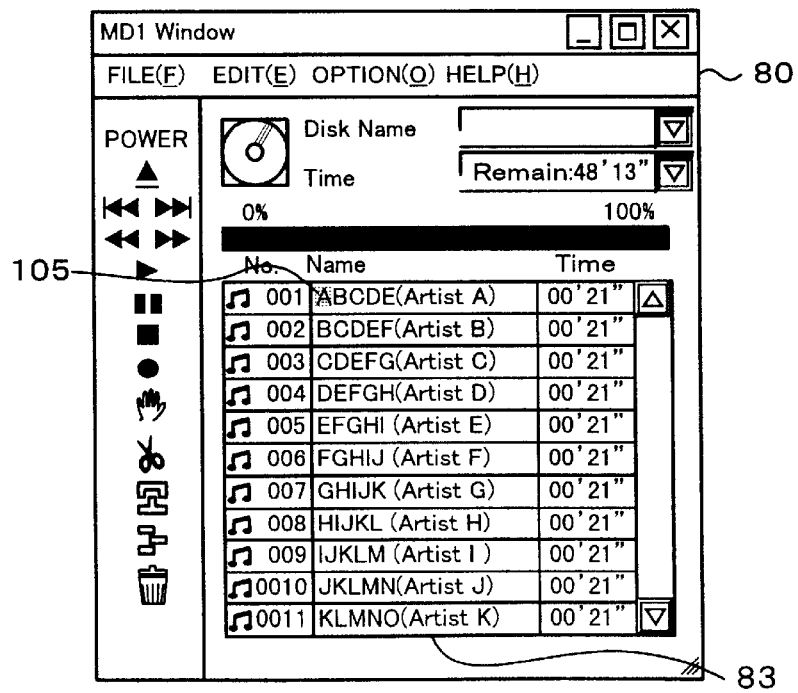
FIG. 15B is a diagram showing a state where the music piece title list was batch pasted from the homepage.

A range is first selected in the WWW browser 100, a predetermined operation, for example, "copy" is selected from a menu, and the character information in the selected range is copied. As shown in FIG. 15A, a paste start position 105 is designated in the window 80 and the copied character information is pasted. As shown in FIG. 15B, thus, the character information selected in a lump in the WWW browser 100 is made correspond to each track from the paste start position 105 and displayed.

In the case where the character information is constructed by only alphabet as shown in this example, it is also possible to preset the display of the name input column 83 so as to correspond to only alphabet.

Although the MD has been used as a recordable medium in the above embodiment, the invention is not limited to the MD. As a recording medium, for example, another optical disc such as a DVD (Digital Versatile Disc), a magnetic tape, an optical tape, a semiconductor memory, or the like can be used. The digital information recorded on the recording medium is not limited to audio data but video data can be also recorded. Further, although the personal computer 40 has been used as a control apparatus in the above example, it can be also constructed as a dedicated control apparatus.

In the above embodiment, as for the copy & paste, after the range was selected and the copy was instructed, the paste start position is designated and, subsequently, the execution of the paste has been instructed. However, the invention is not limited to such a method. For example, character information can be also inputted by using "drag & drop" that is generally used at present in the GUI on the personal computer.

That is, for example, in a state where a character train to be inputted is designated by using the mouse 69, the mouse 69 is moved, thereby moving the cursor display to the outside of the window of the software in which the music piece title list 90 has been displayed. This operation is called a "drag". The cursor is moved as it is to the paste start position of the window 80 and the state where the character train has been designated is released. This operation is called a "drop". By such a series of operations, the copy & paste can be performed by a simple operation.

Figure 17:
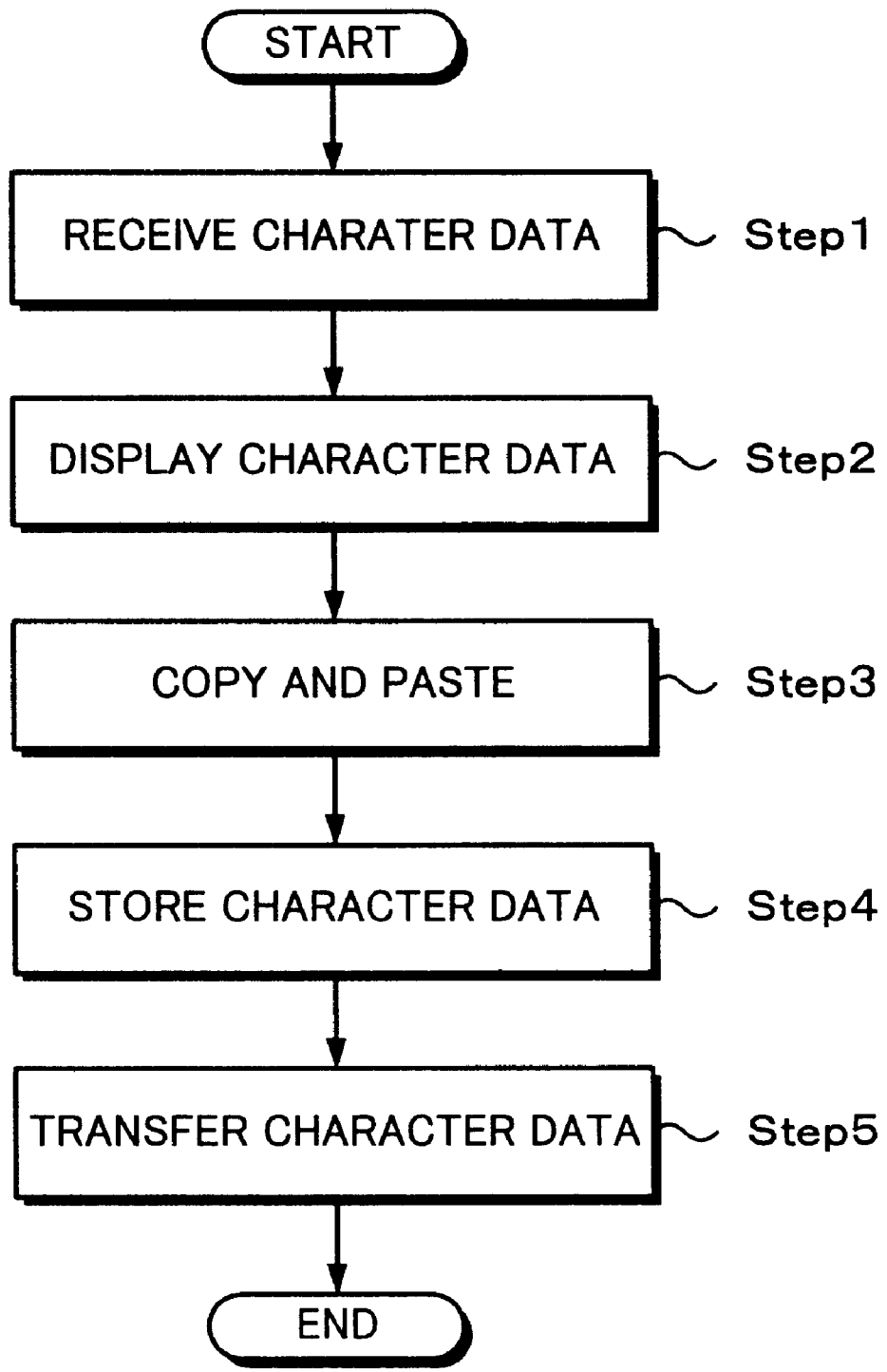
FIG. 17 is a flowchart for use in explanation of the operation of a personal computer in a preferred embodiment of the invention.

FIG. 17 shows a flowchart for explaining processes in the personal computer 40 as a preferred embodiment of the invention. The personal computer 40 is connected to a server of the Internet via, for example, the modem 74, searches a web page by using browser software in step 1, and receives desired character data. In step 2, the personal computer 40 displays the received desired character data onto the display as shown in FIG. 13A. The desired character data is, for example, music piece titles of each program of a commercially available CD album. As shown in FIG. 13B, the desired character data displayed on the display is selected as a series of character data by using the copy & paste in step 3. The user selects the music piece titles of each program of an album dubbed from the CD to the disc 1. When the character data is selected, the series of character data selected is temporarily stored in a memory (not shown) of the personal computer 40 in step 4. In step 5, the series of character data temporarily stored is converted on the basis of a predetermined data communication standard and is transferred to the connected MD recorder 30 via interface 39.

Figure 18:
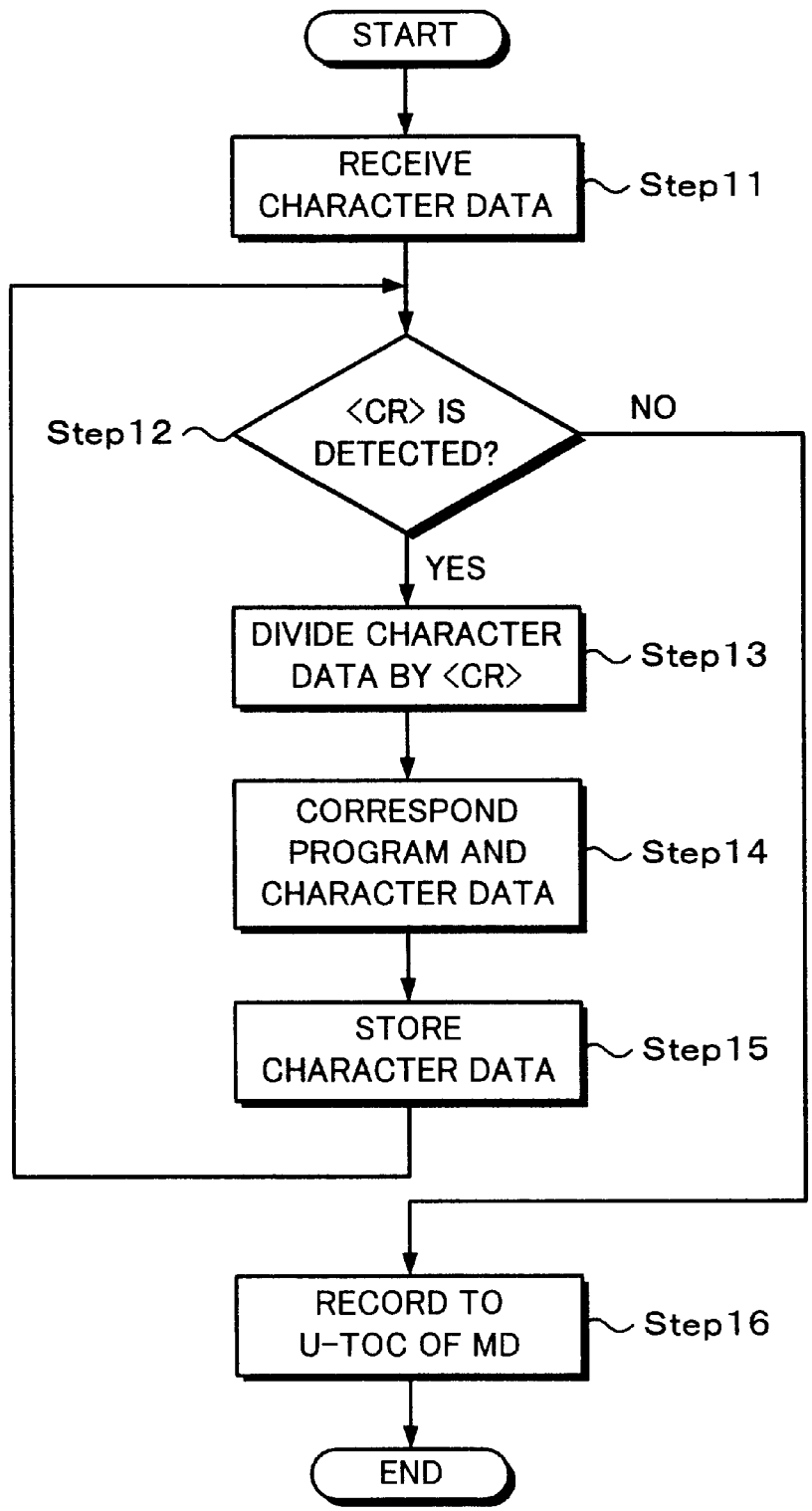
FIG. 18 is a flowchart for use in explanation of the operation of an MD recorder in the preferred embodiment of the invention.

FIG. 18 shows a flowchart for explaining the processes in the MD recorder 30 as a preferred embodiment of the invention. The MD recorder 30 is connected to the personal computer 40 directly or via the interface 66. In step 11, the series of character data selected by the personal computer 40 is received and converted into desired data. In step 12, the carriage return <CR> as an identification symbol showing a division point of the program is detected from the series of received character data. For example, the character train up to a position before the first carriage return in the character data denotes character data showing the title of the first music piece and the character train between the first carriage return to the next carriage return denotes character data showing the title of the second music piece. In step 13, the series of character data is divided on the basis of the carriage return detected in step 12. In step 14, each of the divided character data is made correspond so as to indicate the character data of every program recorded on the disc 1. For example, the character data selected from the web page is linked to the information recorded on the disc 1 in a manner such as a title of the first music piece, title of the second music piece, . . . In step 15, the character data which was made correspond as mentioned above is temporarily stored into the memory (not shown) in the MD recorder 30.

When the character data is fully stored into the memory in the MD recorder 30, the processing routine is returned to step 12 and the processes in steps 13 to 15 are repeated until the carriage return <CR> is not detected from the series of character data received from the personal computer 40. In step 12, when the carriage return <CR> is not detected in the characters received from the personal computer 40, in step 16, the character data is recorded into a predetermined sector of the U-TOC on the disc 1 on the basis of the character data of every program stored in the memory in step 15.

The present invention is not limited to the foregoing embodiments but many modifications and variations are possible within the spirit and scope of the appended claims of the invention.

What is claimed is:

1. A character information copying system for transferring character information from a terminal apparatus to a recording apparatus and recording said character information received from said terminal apparatus onto a recording medium built in said recording apparatus, wherein said terminal apparatus comprises:

receiving means for receiving said character information from a server in which the character information regarding a predetermined program has been accumulated;

display means for displaying the character information received by said receiving means;

selecting means for selecting arbitrary character information from the character information displayed on said display means; and transfer means for transferring the arbitrary character information selected by said selecting means, and wherein said recording apparatus comprises:

receiving means for receiving the arbitrary character information which is transmitted from said transfer means of said terminal apparatus; and recording means for recording the arbitrary character information received by said receiving means onto said recording medium so as to correspond to a predetermined program recorded on said recording medium.

2. A system according to claim 1, wherein an identifier showing a boundary of the character information corresponding to a plurality of programs is added in the arbitrary character information which is transmitted from said transfer means of said terminal apparatus, said system further has dividing means for dividing the arbitrary character information which is transmitted from said transfer means of said terminal apparatus into character trains of every program on the basis of said identifier, and the character trains of every program divided by said dividing means are recorded so as to correspond to the predetermined program recorded on said recording medium.

3. A system according to claim 2, wherein said identifier is a carriage return code indicative of a new line.

4. A system according to claim 2, wherein said identifier is a Tag code indicative of a new line.

5. A system according to claim 2, wherein said identifier is a Tag code indicative of a new line in an HTML description.

6. A system according to claim 1, wherein characters of a plurality of formats are included in the arbitrary character information which is transmitted from said transfer means of said terminal apparatus, and said recording medium has a plurality of character information recording areas to record said arbitrary character information into different recording areas in accordance with said plurality of formats.

7. A recording apparatus comprising:

receiving means for receiving a series of character information constructed by character information of a plurality of programs selected on a terminal apparatus side;

detecting means for detecting an identifier showing a boundary of said plurality of programs from the series of character information received by said receiving means;

dividing means for dividing the series of character information into character information corresponding to each program on the basis of said identifier detected by said detecting means; and recording means for recording the character information of each program divided by said dividing means so as to correspond to a predetermined program recorded on a recording medium.

8. An apparatus according to claim 7, wherein said identifier is a carriage return code indicative of a new line.

9. An apparatus according to claim 7, wherein said identifier is a Tag code indicative of a new line.

10. An apparatus according to claim 7, wherein said identifier is a Tag code indicative of a new line in an HTML description.

11. An apparatus according to claim 7, wherein characters of a plurality of formats are included in the series of character information received by said receiving means, and said recording medium has a plurality of character information recording areas to record said series of character information into different recording areas in accordance with said plurality of formats.

12. A recording method comprising the steps of:

receiving a series of character information constructed by character information of a plurality of programs selected on a terminal apparatus side;

detecting an identifier showing a boundary of said plurality of programs from the series of character information received in said receiving step;

dividing said series of character information into character information corresponding to each program on the basis of said identifier detected in said detecting step;

making the character information of each program divided in said dividing step correspond to a predetermined program recorded on a recording medium; and recording said character information of each said program which was made correspond to said predetermined program onto said recording medium.

13. A method according to claim 12, wherein said identifier is a carriage return code indicative of a new line.

14. A method according to claim 12, wherein said identifier is a Tag code indicative of a new line.

15. A method according to claim 12, wherein said identifier is a Tag code indicative of a new line in an HTML description.

16. A method according to claim 12, wherein characters of a plurality of formats are included in said series of character information which is received in said receiving step, and said recording medium has a plurality of character information recording areas to record said arbitrary character information into different recording areas in accordance with said plurality of formats.

* * * * *